(12) United States Patent
Tarquin et al.

(10) Patent No.: US 10,005,681 B2
(45) Date of Patent: Jun. 26, 2018

(54) SEA WATER REVERSE OSMOSIS SYSTEM TO REDUCE CONCENTRATE VOLUME PRIOR TO DISPOSAL

(71) Applicant: Board of Regents, The University of Texas System, Austin, TX (US)

(72) Inventors: Anthony J. Tarquin, El Paso, TX (US); William S. Walker, El Paso, TX (US); Guillermo G. Delgado, El Paso, TX (US)

(73) Assignee: THE BOARD OF REGENTS OF THE UNIVERSITY OF TEXAS SYSTEM, Austin, TX (US)

( * ) Notice: Subject to any disclaimer, the term of this patent is extended or adjusted under 35 U.S.C. 154(b) by 0 days. days.

(21) Appl. No.: 15/474,297

(22) Filed: Mar. 30, 2017

(65) Prior Publication Data
US 2017/0203979 A1 Jul. 20, 2017

Related U.S. Application Data

(60) Continuation-in-part of application No. 14/299,190, filed on Jun. 9, 2014, which is a division of
(Continued)

(51) Int. Cl.
*B01D 61/00* (2006.01)
*B01D 63/00* (2006.01)
(Continued)

(52) U.S. Cl.
CPC ............ *C02F 1/441* (2013.01); *B01D 61/022* (2013.01); *B01D 61/025* (2013.01); *B01D 61/12* (2013.01);
(Continued)

(58) Field of Classification Search
CPC ................. B01D 61/025; B01D 65/02; B01D 2311/103; B01D 61/08; C02F 1/441; C02F 1/001; C02F 9/00; C02F 1/44
See application file for complete search history.

(56) References Cited

U.S. PATENT DOCUMENTS 4,147,745 A 4/1979 Sano et al.
4,265,959 A 5/1981 Sano et al.
(Continued)

FOREIGN PATENT DOCUMENTS

WO 2007147198 A1 12/2007

OTHER PUBLICATIONS

Bremere, I. et al., Prevention of Silica Scale in Membrane Systems: Removal of Monomer and Polymer Silica, Desalination (2000) 132:89-100.
(Continued)

*Primary Examiner* — Ana Fortuna
(74) *Attorney, Agent, or Firm* — Yee & Associates, P.C.

(57) ABSTRACT

The present invention includes systems and methods for treatment of seawater RO system for recovering most of the water (i.e., 85-90%) from the concentrate of a brackish groundwater reverse osmosis treatment system that may use, e.g., a batch method. With proper pH control and antiscalant dosage, the batch-treatment SWRO system of the present invention can be used to recover water from silica-saturated RO concentrate without fouling the membranes. Silica concentrations of over 1,000 mg/L are attainable with relatively minimal pre-treatment of the silica-saturated feed solution.

19 Claims, 15 Drawing Sheets

Related U.S. Application Data application No. 12/852,240, filed on Aug. 6, 2010, now abandoned.

(60) Provisional application No. 61/233,761, filed on Aug. 13, 2009, provisional application No. 62/409,420, filed on Oct. 18, 2016.

(51) Int. Cl.

| | |
|---|---|
| B01D 35/04 | (2006.01) |
| B01D 35/14 | (2006.01) |
| C02F 1/44 | (2006.01) |
| B01D 21/30 | (2006.01) |
| B01D 21/24 | (2006.01) |
| B01D 61/02 | (2006.01) |
| B01D 69/08 | (2006.01) |
| B01D 65/02 | (2006.01) |
| B01J 47/127 | (2017.01) |
| B01D 61/12 | (2006.01) |
| C02F 103/08 | (2006.01) |
| C02F 101/10 | (2006.01) |
| C02F 101/12 | (2006.01) |
| C02F 101/20 | (2006.01) |

(52) U.S. Cl.
CPC ............ *B01D 65/02* (2013.01); *B01D 69/08* (2013.01); *B01J 47/127* (2017.01); *B01D 2311/04* (2013.01); *B01D 2311/06* (2013.01); *B01D 2311/08* (2013.01); *B01D 2311/14* (2013.01); *B01D 2311/25* (2013.01); *B01D 2317/04* (2013.01); *C02F 2101/101* (2013.01); *C02F 2101/12* (2013.01); *C02F 2101/203* (2013.01); *C02F 2103/08* (2013.01); *C02F 2209/006* (2013.01); *C02F 2209/008* (2013.01); *C02F 2209/02* (2013.01); *C02F 2209/03* (2013.01); *C02F 2209/05* (2013.01); *C02F 2209/06* (2013.01); *C02F 2209/40* (2013.01); *C02F 2301/08* (2013.01)

(56) References Cited

U.S. PATENT DOCUMENTS

| | | | |
|---|---|---|---|
| 4,477,634 | A | 10/1984 | Linder et al. |
| 4,584,103 | A | 4/1986 | Linder |
| 4,678,477 | A | 7/1987 | The et al. |
| 4,906,379 | A | 3/1990 | Hodgins et al. |
| 5,244,579 | A * | 9/1993 | Horner ................. B01D 61/022 210/195.2 |
| 6,113,797 | A | 9/2000 | Al-Samadi |
| 6,126,834 | A | 10/2000 | Tonelli et al. |
| 6,267,891 | B1 | 7/2001 | Tonelli et al. |
| 6,303,037 | B1 | 10/2001 | Tamura et al. |
| 6,508,936 | B1 | 1/2003 | Hassan |
| 7,510,658 | B2 | 3/2009 | Gordon |
| 8,202,429 | B2 | 6/2012 | Abe et al. |
| 2003/0127388 | A1* | 7/2003 | Ando ..................... B01D 61/04 210/636 |
| 2004/0168978 | A1 | 9/2004 | Gray |
| 2006/0011546 | A1 | 1/2006 | Livingston |
| 2006/0065598 | A1 | 3/2006 | Comstock |
| 2007/0034571 | A1 | 2/2007 | Costa et al. |
| 2007/0084795 | A1 | 4/2007 | Jordan |
| 2010/0032375 | A1 | 2/2010 | Jagannathan et al. |
| 2011/0036775 | A1 | 2/2011 | Tarquin |
| 2011/0163031 | A1 | 7/2011 | Kimball et al. |
| 2013/0056413 | A1* | 3/2013 | Miranzadeh ............ C02F 1/441 210/636 |
| 2014/0284276 | A1* | 9/2014 | Tarquin ................ B01D 61/022 210/654 |
| 2016/0052812 | A1* | 2/2016 | Chidambaran ......... C02F 1/441 210/636 |
| 2016/0167999 | A1* | 6/2016 | Piedra-Garza ............ C02F 1/42 210/636 |

OTHER PUBLICATIONS

Burton, J. D. et al., The Reactivity of Dissolved Silicon on Some Natural Waters, Limnology and Oceanography (1970) 15(3):473-476.

Coradin, T. et al., Biogenic Silica Patterning: Simple Chemistry or Subtle Biology?, Chem, Bio. Chem. (2003) 4 (4):251-259.

Darton, E.G., RO Plant Experiences with High Silica Waters in the Canary Islands, Desalination (1999) 124:33-41.

Lisitsin, D. et al., Critical Flux Detection in a Silica Scaling RO System, Desalination (2005) 186:311-318.

Ning, R. Y. et al., Recovery Optimization of RO Concentrate from Desert Wells, Desalination (2006) 201:315-322.

Ning, R. Y., Process Simplification Through the Use of Antiscalants and Antifoulants, Ultrapure Water (2007) 20 (7):17-20.

Nin, R. Y. et al., Chemical Control of Colloidal Fouling of Reverse Osmosis Systems, Desalination (2005) 172:1-6.

Sheikholeslami, R. et al., Effects of Water Quality on Silica Fouling of Desalination Plants, Desalination (1999) 126:267-280.

Tarquin, A., Volume Reduction of High-Silica RO Concentrate Using Membranes and Lime Treatment, U.S. Department of the Interior, Bureau of Reclamation, DWPR Report No. 108, Feb. 2005, 54 pages.

Tarquin, A., Cost Effective Volume Reduction of Silica-Saturated RO Concentrate, U.S. Department of the Interior, Bureau of Reclamation, DWPR Report No. 125, Mar. 2006, 55 pages.

Advanced Physical-Chemical Water Treatment Processes course: MWH's Water Treatment: Principles and Design, 3rd Ed., Crittenden et al, (2012) Wiley, p. 193.

Advanced Physical-Chemical Water Treatment Processes course: MWH's Water Treatment: Principles and Design, 3rd Ed., Crittenden et al, (2012) Wiley, p. 207.

Advanced Physical-Chemical Water Treatment Processes course: MWH's Water Treatment: Principles and Design, 3rd Ed., Crittenden et al, (2012) Wiley, p. 822.

* cited by examiner

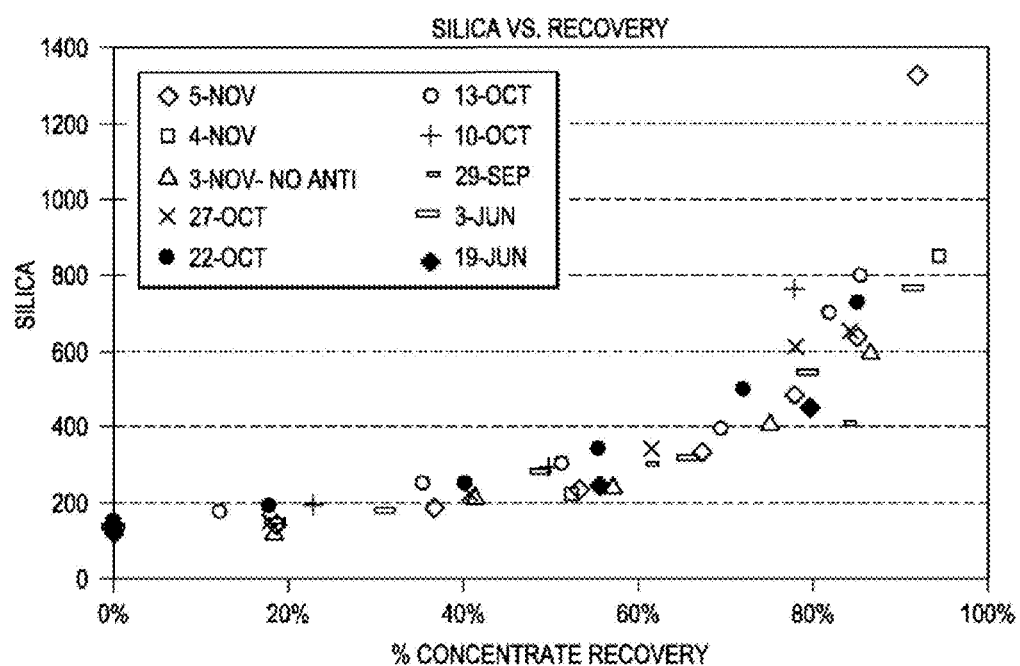
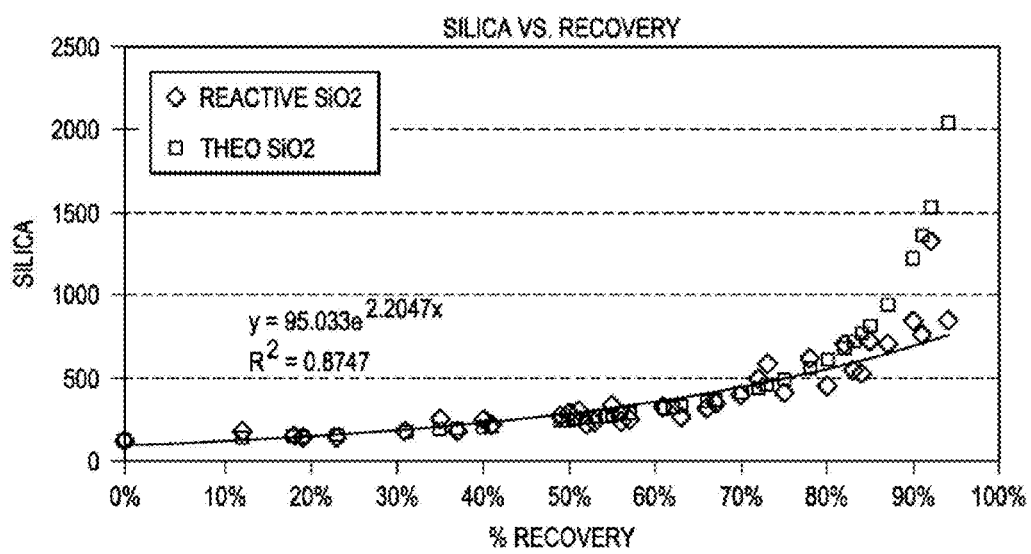

SEA WATER REVERSE OSMOSIS SYSTEM TO REDUCE CONCENTRATE VOLUME PRIOR TO DISPOSAL

CROSS-REFERENCE TO RELATED APPLICATIONS

The present application is a continuation-in-part of nonprovisional U.S. patent application Ser. No. 14/299,190, entitled "Sea Water Reverse Osmosis System to Reduce Concentrate Volume Prior to Disposal," filed Jun. 9, 2014. Patent application Ser. No. 14/299,190 is incorporated herein by reference in its entirety.

Patent application Ser. No. 14/299,190 is a divisional patent application of U.S. patent application Ser. No. 12/852,240, filed on. Aug. 6, 2010, entitled "Sea Water Reverse Osmosis System to Reduce Concentrate Volume Prior to Disposal." U.S. patent application Ser. No. 12/852,240 is herein incorporated by reference in its entirety. U.S. patent application Ser. No. 12/852,240 claims priority to and the benefit of U.S. Provisional Patent Application Ser. No. 61/233,761, filed Aug. 13, 2009. U.S. Provisional Application Ser. No. 61/233,761 is incorporated herein by reference.

The present patent application further claims priority to and the benefit of, U.S. Provisional Patent Application Ser. No. 62/409,420 filed Oct. 18, 2016. U.S. Provisional Application Ser. No. 62/409,420 is incorporated herein by reference.

TECHNICAL FIELD

Embodiments are generally related to water recovery. Embodiments are also related to methods and systems for water desalination. Embodiments are further related to methods and systems for enhanced water recovery.

The embodiments, in general, relate to the field of water desalination, and more particularly to the use of a seawater reverse osmosis system (SWRO) to reduce the volume of silica-saturated, reverse osmosis (RO), or other membrane concentrate by recovering most of the water from the concentrate.

BACKGROUND

Without limiting the scope of the invention, its background is described in connection with the methods for treatment of brine and for reducing volumes of silica saturated membrane concentrates.

WIPO Patent Application Publication No. WO 2007/147198 (Fabig, 2007) describes a method and apparatus for improving the recovery of product liquid from a filter apparatus such as a reverse osmosis apparatus which includes operating the apparatus at or above a scaling threshold and when necessary cleaning the apparatus. The apparatus may use two units in parallel with one unit cleaning while the other unit is operating. The apparatus may be used to process reject brackish water from a reverse osmosis plant to minimize the amount of reject water.

U.S. Pat. No. 6,113,797 issued to Al-Samadi (2000) discloses a high water recovery membrane purification process. The '797 patent describes a two-stage high pressure high recovery process utilizing two reverse osmosis membrane systems intended to provide very high overall water recoveries from contaminated inorganic scale-containing water in an economical manner while preventing scale formation on the membrane and prolonging the useful life of the membrane. The first stage of the process involves using a low pressure membrane system to preconcentrate scale compounds while purifying the bulk volume of the scale-containing water (using antiscalants with pH control) and combining the influent water with a recycle stream of concentrate from the second stage membrane process in order to prevent scale formation. This first stage membrane system is followed by a second stage membrane system wherein the concentrate from the first stage membrane system is treated further at higher pressure in order to provide purification of the remaining preconcentrated stream and achieve very high overall water recoveries.

U.S. Pat. No. 6,508,936 issued to Hassan (2003) describes a desalination process in which combines two or more substantially different water treatment processes in a unique manner to desalinate saline water, especially sea water, to produce a high yield of high quality fresh water, including potable water, at an energy consumption equivalent to or less than much less efficient prior art desalination processes. The '936 patent describes a process wherein a nanofiltration step is synergistically combined with at least one of sea water reverse osmosis, multistage flash distillation, multieffect distillation of vapor compression distillation to provide an integrated desalination system by which sea water can be efficiently and economically converted to high quality potable water in yields which are at least 70%-80% greater than the yields available from the prior art processes. Typically a process of this invention using the nanofiltration initial step will produce, with respect to sea water feed properties, calcium, magnesium, sulfate, and bicarbonate ion content reductions of 63%-94%, pH decreases of about 0.4-0.5 units, and total dissolved solids content reductions of 35%-50%.

BRIEF SUMMARY

The present invention describes the design and the development of a pilot scale and a full-scale automated batch treatment SWRO system to reduce the volume of silica-saturated, reverse osmosis (RO), or other membrane concentrate by recovering most of the water from the concentrate.

In one embodiment, the present invention includes a small-scale system for water recovery comprising: one or more holding or feed tanks; one or more membrane units, wherein the membrane units comprise one or more semipermeable reverse osmosis membranes; a high pressure pumping system, wherein the pumping system comprises one or more pumps operating in a recirculating mode, wherein the one or more pumps pump a concentrate from the one or more feed tanks to the one or more membrane units and also recycle the concentrate back to the feed tanks; one or more heat exchangers connected to the one or more feed tanks; a tank for collecting a final permeate; one or more optional sensors for measuring a pH, a permeate, a concentrate flow rate, a pressure, a temperature, and a conductivity; and one or more optional ancillary equipment, wherein the optional equipments are selected from the group consisting of a vacuum generator, a condenser, and a cooling tower. The system of the present invention is operated in a batch mode.

In another aspect, the feed tank has a capacity of 5, 10, 20, 30, 50, 75, 100, 1,000, 10,000, 100,000, 1,000,000, and 10,000,000 gallons. In another aspect, the concentrate is pumped from the feed tank to the membrane unit at a pressure of 100 psi, 200 psi, 500 psi, 700 psi, 800 psi, 900 psi, 1,000 psi, and 1,200 psi. In another aspect, the concentrate is pumped from the feed tank to the membrane unit at a pressure of up to 1,200 psi, e.g., 700 psi. In another aspect, the concentrate is selected from the group comprising a reverse osmosis concentrate, a membrane concentrate, a saline water, a brackish water, a silica-saturated water, a sea water, an inorganic-scale containing water, and a water containing one or more dissolved solids. In another aspect, the one or more semi-permeable reverse osmosis membranes comprises a spiral-wound or a hollow-fiber membrane selected from the group consisting of a polyimide membrane, a cellulose ester membrane (CEM), a charge mosaic membrane (CMM), a bipolar membrane (BPM), anion exchange membrane (AEM), an alkali anion exchange membrane (AAEM), and a proton exchange membrane (PEM). In another aspect, the concentrate is a silica-saturated reverse osmosis concentrate, e.g., in a system increases a silica concentration in the silica-saturated reverse osmosis concentrate to less than 1,000 mg/1.

In another embodiment, the present invention includes a method of reducing a volume of a concentrate prior to disposal comprising the steps of: transferring the concentrate to a feed tank or a holding tank; feeding the concentrate from the feed tank to a membrane unit by pumping at a high pressure, wherein the membrane unit comprises one or more semi-permeable reverse osmosis membranes; passing the concentrate through the one or more semi-permeable reverse osmosis membranes; recirculating the concentrate back to the feed tank and repeating the method until a desired reduction in the volume of the concentrate is achieved; and collecting a final permeate in a permeate tank, wherein the final permeate comprises the reduced volume concentrate. In one aspect, the method includes the optional step of operating a heat exchanger attached to the feed tank to maintain a temperature of the recirculated concentrate. The step of reducing the volume of the concentrate is done in a batch mode. In another aspect, the feed tank has a capacity of 5, 10, 20, 30, 50, 75, 100, 1,000, 10,000, 100,000, 1,000,000, and 10,000,000 gallons or more. In another aspect, the concentrate is pumped from the feed tank to the membrane unit at a pressure of up to 1,200 psi, e.g., 700 psi. In another aspect, the concentrate is selected from the group consisting of a reverse osmosis concentrate, a membrane concentrate, a saline water, a brackish water, a silica-saturated water, a sea water, an inorganic-scale containing water, and a water containing one or more dissolved solids. Non-limiting examples of semi-permeable reverse osmosis membranes include a spiral-wound or a hollow-fiber membrane selected from the group consisting of a polyimide membrane, a cellulose ester membrane (CEM), a charge mosaic membrane (CMM), a bipolar membrane (BPM), an anion exchange membrane (AEM), an alkali anion exchange membrane (AAEM), and a proton exchange membrane (PEM). In another aspect, the concentrate is a silica-saturated reverse osmosis concentrate. In another aspect, the method has a percent recovery of 84-96% or even a percent recovery of 50%, 60%, 70%, 80%, 85%, 90%, 95%, and 97%.

Yet another embodiment of the present invention includes a system for reducing a volume of a concentrate and for water-recovery comprising: one or more feed tanks for holding the concentrate; one or more membrane units comprising one or more semi-permeable reverse osmosis membranes; a high pressure pumping system, wherein the pumping system comprises one or more pumps for pumping the concentrate from the one or more feed tanks to the one or more membrane units and for optionally recycling the concentrate back to the feed tanks from the one or more membrane units; one or more heat exchangers connected to the one or more feed tanks; a permeate tank for collecting a final permeate; a database system contained in a computer, wherein the database system logs a reading or a measurement from the system at a specified interval or in real-time, wherein the computer is accessible via an internet at all times; one or more sensors for measuring a pH, a permeate, a concentrate flow rate, a pressure, a temperature, and a conductivity; and one or more optional ancillary equipment, wherein the optional equipments are selected from the group consisting of a vacuum generator, a condenser, and a cooling tower.

Yet another embodiment of the present invention is a method of reducing a volume and a silica concentration of a silica saturated reverse osmosis concentrate prior to disposal comprising the steps of: transferring the concentrate to a feed tank or a holding tank; feeding the concentrate from the feed tank to a membrane unit by pumping at a high pressure, wherein the membrane unit comprises four semi-permeable reverse osmosis membranes arranged in a parallel single-stage configuration; passing the concentrate through the membrane unit; recirculating the concentrate back to the feed tank and repeating the method till a desired reduction in the volume and the silica concentration of the concentrate is achieved; and collecting a final permeate in a permeate tank, wherein the final permeate comprises the reduced volume reverse osmosis concentrate having a reduced silica concentration. In one aspect, the method includes the optional step of operating a heat exchanger attached to the feed tank to maintain a temperature of the silica saturated reverse osmosis concentrate.

DESCRIPTION OF DRAWINGS

For a more complete understanding of the features and advantages of the present invention, reference is now made to the detailed description of the invention along with the accompanying figures and in which:

FIG. 8 is a plot of the silica concentration vs. the % concentrate recovery for nine different runs;

FIG. 9 is a plot showing the results of the regression analysis of the measured silica concentrations vs. calculated theoretical concentrations;

DETAILED DESCRIPTION

Figure 1:
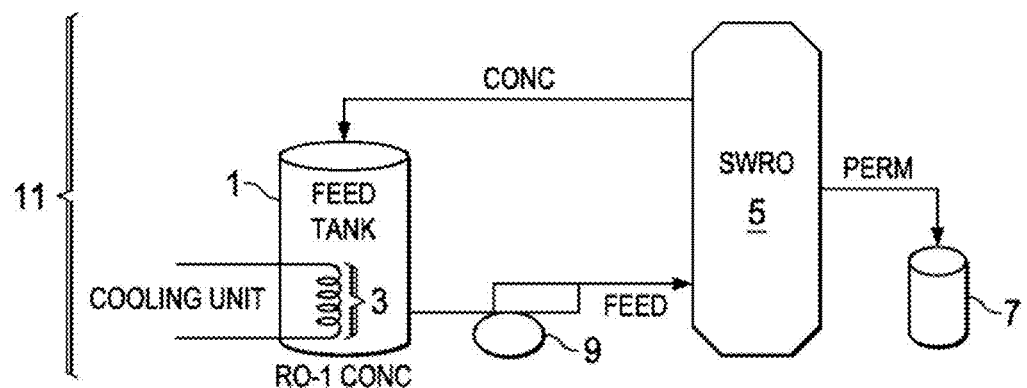
FIG. 1 is a schematic showing the seawater RO pilot system of the present invention.

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific, ways to make and use the invention and do not delimit the scope of the invention.

To facilitate the understanding of this invention, a number of terms are defined below. Terms defined herein have meanings as commonly understood by a person of ordinary skill in the areas relevant to the present invention. Terms such as "a," "an," and "the" are not intended to refer to only a singular entity, but include the general class of which a specific example may be used for illustration. The terminology herein is used to describe specific embodiments of the invention, but their usage does not delimit the invention, except as outlined in the claims.

The term "reverse osmosis" as used herein is applied to a process wherein pressure is applied to a concentrate on one side of a semi-permeable membrane to force the entraining liquid through the pores of the membrane while the entrained material is retained on the other side of the membrane. It is called "reverse osmosis" because "osmosis" is defined as the passage of a liquid from a dilute to a more concentrated solution through the membrane, whereas "reverse osmosis" uses the same principle but, by applying pressure to the concentrated solution, forces flow of the permeate liquid in the reverse direction.

The term "membrane" is intended to include any barrier which is substantially permeable to the solvent and substantially impermeable to the solute. As used herein, the term "membrane unit" means at least one membrane or a unit having a membrane module. A "membrane unit" may, for example, have a membrane module or a plurality of membrane modules connected in series or parallel or an arrangement of membrane modules connected in parallel and in series. The membrane modules used may be commercial modules. In the membrane modules, one or more membranes may be present.

The term "semi-permeable membrane" as used herein includes any semi-permeable material which can be used to separate components of a feed fluid into a permeate that passes through the material and a retentate that is rejected or retained by the material. For example, the semi-permeable material may comprise organic polymers, organic co-polymers, mixtures of organic polymers, or organic polymers mixed with inorganics. Suitable organic polymers include polysulfones; poly(styrenes), including styrene-containing copolymers such as acrylonitrile-styrene copolymers, styrene-butadiene copolymers and styrene-vinylbenzylhalide copolymers; polycarbonates; cellulosic polymers, such as cellulose acetate-butyrate, cellulose propionate, ethyl cellulose, methyl cellulose, nitrocellulose, etc.; polyamides and polyimides, including aryl polyamides and aryl polyimides; polyethers; poly(arylene oxides) such as poly(phenylene oxide) and poly(xylene oxide); poly(esteramide-diisocyanate); polyurethanes; polyesters (including polyarylates), such as poly(ethylene terephthalate), poly(alkyl methacrylates), poly(alkyl acrylates), poly(phenylene terephthalate), etc.; polysulfides; polymers from monomers having alpha-olefinic unsaturation other than mentioned above such as poly(ethylene), poly(propylene), poly(butene-1), poly(4-methyl pentene-1), polyvinyls, e.g. poly(vinyl chloride), poly(vinyl fluoride), poly(vinylidene chloride), poly(vinylidene fluoride), poly(vinyl alcohol), poly(vinyl esters) such as poly(vinyl acetate) and poly(vinyl propionate), poly(vinyl pyridines), poly(vinyl pyrrolidones), poly(vinyl ethers), poly(vinyl ketones), poly(vinyl aldehydes) such as poly(vinyl formal) and poly(vinyl butyral), poly(vinyl amides), poly(vinyl amines), poly(vinyl urethanes), poly (vinyl ureas), poly(vinyl phosphates), and poly(vinyl sulfates); polyallyls; poly(benzobenzimidazole); polyhydrazides; polyoxadiazoles; polytriazoles; poly(benzimidazole); polycarbodiimides; polyphosphazines; etc., and interpolymers, including block interpolymers containing repeating units from the above such as terpolymers of acrylonitrile-vinyl bromide-sodium salt of para-sulfophenylmethallyl ethers; and grafts and blends containing any of the foregoing. Such organic polymers can optionally be substituted, for example, with halogens such as fluorine, chlorine and bromine; hydroxyl groups; lower alkyl groups; lower alkoxy groups; monocyclic aryl; lower acyl groups, and the like. Semi-permeable membranes can also include modified versions of organic polymers. For example, organic polymers can be surface modified, surface treated, cross-linked, or otherwise modified following polymer formation to provide additional semi-permeable materials that can be included in semi-permeable membranes. For example, see U.S. Pat. Nos. 4,584,103, 4,906,379, 4,477,634, 4,265,959, and 4,147,745 for examples of modified organic, polymers.

The term "heat exchanger" used herein includes any indirect heat transfer apparatus, such as heat exchangers employed to heat or cool process fluids in the absence of chemical reaction and, particularly, heat exchangers employed in the conducting of strongly endothermic chemical reactions (dehydrogenation, cracking, etc.) and strongly exothermic chemical reactions (polymerization, isomerization, alkylation, etc.).

As used herein, the term "condenser" is used to describe any vessel providing indirect heat transfer from a gaseous flow so as to effect the liquefaction of a portion of that flow. The term "cooling tower" as employed herein includes all systems in which water is utilized as a fluid or liquid coolant over heat transfer surfaces. The term includes cooling towers of all configurations and heat rejecting equipment where water is circulated from a reservoir and sprays or falls over heated material. It involves air movement and evaporative cooling of the water.

A "batch mode" as used herein refers to a processing or manufacturing operation, wherein all the components are assembled at one step, in a group before moving the group to the next and other subsequent steps of the production process.

The terms "saline water" or "brine" as used herein broadly includes water containing any substantial concentration of dissolved inorganic salts, regardless of the particular concentration. Thus, "saline water" or "brine" may broadly refer to water containing anywhere from about 1,000 ppm to high percentages of dissolved salts. The term "brackish water" refers to water having an amount of dissolved salts greater than 0.5 grams per liter. The term "brackish water" can also encompass salt water.

As used herein, the term "spiral wound membrane" refers to a structure wherein a membrane sandwich, such as two flat sheet membranes that are separated by a flat sheet porous channel spacer member, is wound about a centrally-located product water or permeate collection tube to thereby assume a convenient cylindrical form that is then placed into a hollow, cylindrical shaped, outer housing member. Prior to winding, three sides of the membrane sandwich are glued together, and the fourth side is glued into the product water collection tube. A feed water stream is passed into one end of the cylindrical module and along one side of the wound membrane sandwich. This feed water permeates the membrane and passes into the channel spacer member as product water. The product water travels in a spiral until it reaches the center or longitudinal axis of the module. There, the product water flows through small holes that are formed in the product water collection tube whereupon the water exits the module through a product water outlet. Retentate that does not permeate the membrane exits the module through an outlet at the opposite end of the module. Generally, in a spiral wound membrane, the individual layers of the spiral-wound membrane do not experience the same magnitude of liquid pressure or pressure differential.

The term "hollow fiber module" as used herein includes structures wherein a relatively large number of elongated, small diameter, and hollow membrane tubes are packed into a cylindrically shaped, high pressure, housing, such that the elongated central cavity of all tubes extend in a common direction from one end of the housing to the other. A feed water stream is passed into the housing and along the outer cylindrical surfaces of all tubes. This feed water permeates the membrane tubes. Product water then travels through the center of all membrane tubes until it reaches one end of the housing. There, the product water exits the housing through a product water outlet. Retentate that does not permeate the membrane tubes exits the housing module through a retentate outlet that is located at the other end of the housing. In general, all membrane tubes experience the same magnitude of liquid pressure or pressure differential.

The present invention describes a seawater RO treatment of RO concentrate to extreme silica concentrations. Severe restrictions exist in the disposal of the concentrate from the 15 mgd (2370 m3/h) reverse osmosis (RO) plant in El Paso, Tex. (i.e., 15 mgd blended to 27.5 mgd). The current permit for the disposal by deep well injection limits the total dissolved solids in the brine to 10,000 mg/l. This limits water recovery in the plant and drives up the cost of sending a large volume of the concentrate a long distance for discharge.

The present inventors have developed a concentrate treatment process aimed at zero liquid discharge or a greatly reduced concentrate volume suitable for evaporation ponds. This disclosure documents the demonstration of the feasibility of using a seawater RO system and synergistic antiscalant and low pH inhibition of reactive silica polymerization to concentrate the primary brackish water RO concentrate to total silica concentrations up to and exceeding 1,000 mg/l. The approach of the present invention makes possible the use of tandem brackish RO followed immediately by a seawater RO (SWRO) process to achieve an overall water recovery of greater than 96%, limited only by the highest pump pressures to overcome the resulting osmotic pressures.

Pilot plant data using a single, seawater RO membrane and 700-740 psi feed pressure concentrating the brackish RO concentrate in a batch recirculation mode is described in this disclosure. Recoveries of water in the 84-96% range were performed repeatedly with no apparent fouling of the membrane and no precipitation in the super-concentrate. The flux reduction curves in each case were consistent with gradual reduction of net driving pump pressure due to the rise in osmotic pressure that needs to be overcome. The reactive and total silica concentration profiles provided insights on the effects on membrane operation during buildup of reactive silica concentration with or without the increasing amounts of colloidal polymeric hydrated silica expected from the spontaneous polymerization of the reactive silicic acid monomer.

A problem faced by inland communities who undertake brackish water desalting projects is what to do with the concentrate that is generated in the process (the most common disposal option of surface water discharge is obviously not available to inland communities). Research funded by the U.S. Bureau of Reclamation and others indicated that it might be economically feasible to recover additional water from silica-saturated RO concentrate through lime treatment followed by second-pass RO, thereby possibly rendering evaporation and/or other options more viable.

The present disclosure describes the use of a vibratory process technology and a batch-treatment seawater reverse osmosis (SWRO) system to recover additional water from the silica-saturated RO concentrate that is generated at the Kay Bailey Hutchison (KBH) desalting plant in El Paso, Tex. The location of the 15 mgd (2370 m3/h) capacity RO plant in a land-locked highly populated region makes the design of an acceptable concentrate disposal process a challenging task. Variable salinity in well waters reaching above 1500 mg/l and a cap of 10,000 mg/l allowed for deep-well injection of the concentrate restricts the degree of salinity concentration, hence limiting the maximum water recovery rate of the plant. The need for water conservation and the high cost of pumping the concentrate waste to a distant injection well provide strong incentives for developing an alternate, and more economic method, of treating the RO reject.

The results showed that while a vibratory process technology can be used, the SWRO option was preferable from economic and operational points of view. By reducing the pH and using an antiscalant for calcium sulfate control, recoveries in the 85-90% range were achieved with the SWRO system without fouling the membranes. Reactive silica concentrations of over 1,000 mg/L were measured in the concentrated concentrate.

Implementation of a full-scale SWRO system as described in the present disclosure at the KBH plant would generate an additional four million gallons of water per day at a cost of less than $1.87 per thousand gallons. At 85% recovery of concentrate, there would be net cash, flow exceeding $178,000 and the overall water recovery at the plant would increase to 97%.

The present inventors have reported the pilot-scale demonstration of an overall recovery of 97% of water by operating the primary RO at 85-90% recovery, followed by lime-softening of the concentrate then a second RO in tandem for another high recovery. The recovery-limiting foulant in the primary RO was shown to be silica and lime-softening greatly reduced the silica concentration.

A problem faced by any inland water desalting facility deals with the disposal of the brine solution that is generated in the reverse osmosis process. The problem is exacerbated when the raw water supply contains substances that could foul membranes if an excessive amount of permeate is extracted for the brackish feed water. This is the case in the city of El Paso, where the brackish groundwater contains silica at an average concentration of 25-30 mg/L. At this concentration, recovery of product water will be limited to about 75% (if no antiscalants are used) because above this value, silica will precipitate, fouling the membranes. Since the KBH plant uses an antiscalant, the plant is operated at a recovery of 80%, which results in a concentrate volume of about 3 million gallons per day with a silica concentration of 125 mg/L. At the present time, the concentrate is disposed of via injection wells located 23 miles from the plant.

Two different pilot-scale studies done by the present inventors, funded by the U.S. Bureau of Reclamation and EPWU showed that it was economically feasible to recover over 80% of the silica-saturated brine concentrate through lime precipitation of some of the silica. Both studies were conducted at the same pilot plant site that was used for collecting design information for the KBH plant.

Spontaneous polymerization of silicic acid in water, generally referred to as molybdate-reactive silica, form larger and larger polymeric non-reactive silica species in water in colloidal forms. Silica fouling is a major challenge to the operation and maintenance of brackish water ROs. Laboratory studies discerned parameters that affect the severity of silica fouling. Antiscalants and antifoulants are introduced aimed at inhibiting the rate of polymerization of reactive silica or at the dispersion of colloidal silica.

The objective of the present invention is to greatly reduce the volume of the primary RO concentrate with the use of acidification to reduce silica polymerization rate as an alternative to the lime-softening approach reported earlier. In the laboratory, it has been shown that silicic acid polymerization is severely retarded by acidic pHs as suggested in the literature, and that pH control can be synergistic with antiscalant action. In the present disclosure, the inventors report an approach by which total silica concentrations exceeding 1,000 mg/l can be attained with a seawater RO in tandem with the primary brackish water RO. By injecting an acid into the seawater RO feed along with an antiscalant, an overall recovery of 96% was reached as a continuous process using a tandem RO. In the El Paso water, studies in the present invention of the limiting factor for higher recovery is projected to be the osmotic pressure that needs to be overcome by the anticipated 1,000 psi limit of a seawater RO system.

The efficiency of a tandem RO process that can concentrate the total dissolved solids (TDS) in brackish waters to the maximum 1,000 psi of osmotic pressure in the concentrate is highly desirable. Continuous operation without stoppage to treat the intermediate concentrate of the primary RO eliminates the time given to super-saturated brine to deposit foulants. Rapid concentration of dissolved salts improves the conditions in which the fractionation of the less soluble multivalent salts of calcium, magnesium, barium, and strontium can be optimized, leaving the more soluble monovalent sodium and potassium behind for further concentration and recovery.

The present disclosure describes a continuous tandem RO process to reach an overall water recovery of 96% (or higher with a higher pressure pump), total silica concentration exceeding 1,000 mg/1, and TDS at least double the seawater range. The system of the present invention can be used for longer periods of continuous operation and minimized antiscalant and acid dosages. Data on the fractionation of salts from the super-concentrate will be reported elsewhere.

The KBH desalination plant takes well water from the Hueco Bolson aquifer and filters it through a sand strainer and 5 micron cartridge filter before the RO plant. An antiscalant (Pretreat Plus-Y2K) with silica polymerization inhibitor activity is injected at a 4 ppm dosage. Five membrane banks with the capacity of producing 3 mgd (474 m3/hr) each of permeate gave a total capacity of 15 mgd (2370 m3/hr) of permeate and 3 mgd (474 m3/hr) of concentrate at a recovery rate of 82%. The typical composition of the blended well water entering the plant and the concentrate are given in Table 1. The concentrate was pumped more than 20 miles across the desert to three deep well injection sites, where it is then distributed downward into a fractured rock formation of low quality water more than 3,500 feet (1070 meters) below the surface. The discharge permit currently limits the maximum TDS of the concentrate to 10,000 mg/1, a very difficult and expensive situation for the plant. During the piloting period, the primary RO recovery of 86-90% was attained.

Seawater RO pilot studies: A schematic of the SWRO test system 11 used to concentrate the primary RO concentrate in a batch operation mode is shown in FIG. 1. Concentrate from the KBH plant was put into a 30-gallon (114 liter) holding/feed tank 1. The concentrate was acidified with sulfuric acid to pH 3-5 in the tank 1 along with the addition of an antiscalant (Pretreat Plus-0400) for controlling extremely high sulfate scaling potentials. The solution was fed into the SWRO unit 5 at 700 psi, using a high pressure pumping system 9 in a recirculation mode. The concentrate recycled back to the feed tank 1 until the desired recovery was achieved. A heat exchanger 3 kept the feed solution from getting too hot. The SWRO permeate was collected in tank 7.

Representative data from five runs performed under different conditions on different days are presented. In each case, the concentration process was carried to near the limit of the net-driving pressure required by the pump to overcome osmotic pressure. The super-concentrates remained clear and the membrane did not appear to foul. Initial fluxes remained the same at the start of each run with just a simple rinse out with permeate water.

TABLE 1

KBH Concentrate Characteristics.

| Parameter | 2007 | | | 2008 | | | 2009 | | | % Change '07-'09 |
|---|---|---|---|---|---|---|---|---|---|---|
| | Min | Average | Max | Min | Average | Max | Min | Average | Max | |
| Cl | 2400 | 4239 | 8890 | 265 | 4699 | 9710 | 4840 | 5089 | 5540 | 20.1% |
| SO$_4$ | 453 | 896 | 1970 | 127 | 1039 | 2110 | 1050 | 1111 | 1200 | 23.9% |
| ALK-P | 0 | 0 | 0 | 2.5 | 6.9 | 12.5 | 0 | 0 | 0 | |
| ALK-T | 266 | 424 | 499 | 18.8 | 412 | 498 | 400 | 427 | 445 | 0.6% |
| Ba | 0.042 | 0.31 | 0.48 | | | | | | | |

TABLE 1-continued

KBH Concentrate Characteristics.

| Parameter | 2007 | | | 2008 | | | 2009 | | | % Change '07-'09 |
|---|---|---|---|---|---|---|---|---|---|---|
| | Min | Average | Max | Min | Average | Max | Min | Average | Max | |
| B | 0.028 | 0.11 | 0.17 | | | | | | | |
| $CL_2$-F | 0.05 | 0.09 | 0.16 | 0.05 | 0.07 | 0.09 | | | | |
| $CL_2$-T | 0.05 | 0.11 | 0.27 | 0.05 | 0.06 | 0.1 | | | | |
| EC | 1640 | 15185 | 23400 | 1040 | 16267 | 22100 | 16600 | 18122 | 20200 | 19.3% |
| Fe | 0.03 | 0.11 | 0.6 | 0.03 | 0.13 | 0.57 | 0.03 | 0.07 | 0.12 | −36.4% |
| T Hard | 1180 | 1898 | 3770 | 528 | 2089 | 3030 | 2050 | 2291 | 2430 | 20.7% |
| Mn | 0.09 | 0.17 | 0.23 | 0.1 | 0.16 | 0.21 | 0.11 | 0.17 | 0.22 | −0.3% |
| ortho-P | 0.1 | 0.16 | 0.27 | 0.1 | 0.16 | 1.26 | 0.11 | 0.19 | 0.49 | 21.4% |
| pH | 7.5 | 7.9 | 8.1 | 7.1 | 8.0 | 8.3 | 7.6 | 7.8 | 8.0 | −1.4% |
| Ca | 303 | 516 | 1100 | 376 | 589 | 793 | 281 | 608 | 937 | 17.8% |
| K | 45.5 | 74 | 114 | 4.9 | 76 | 99.7 | 43 | 113 | 759 | 53.4% |
| Mg | 88.8 | 140 | 258 | 0.9 | 153 | 208 | 85.7 | 161 | 183 | 14.9% |
| Na | 208 | 2398 | 4220 | 172 | 2674 | 4200 | 1730 | 2810 | 3260 | 17.2% |
| Sr | 8.74 | 17.1 | 30.1 | | | | | | | |
| $SiO_2$ | | | | 28.7 | 148 | 228 | 26.9 | 131 | 173 | |
| TDS | 6890 | 8738 | 15300 | 6740 | 10412 | 13200 | 10300 | 10722 | 11200 | 22.7% |
| CALC-TDS | 1070 | 9867 | 15200 | 677 | 10566 | 14400 | 10800 | 11772 | 13100 | 19.3% |
| Temp | 20.5 | 21.9 | 24 | 18.9 | 24.1 | 221 | 23.3 | 25.4 | 26.3 | 15.8% |
| Turb | 0.07 | 0.22 | 1.62 | 0.08 | 0.85 | 14.6 | 0.06 | 0.30 | 1.94 | 34.3% |
| | | | | | | | | | Avg = | 15.5% |

EXAMPLE I

Figure 2:
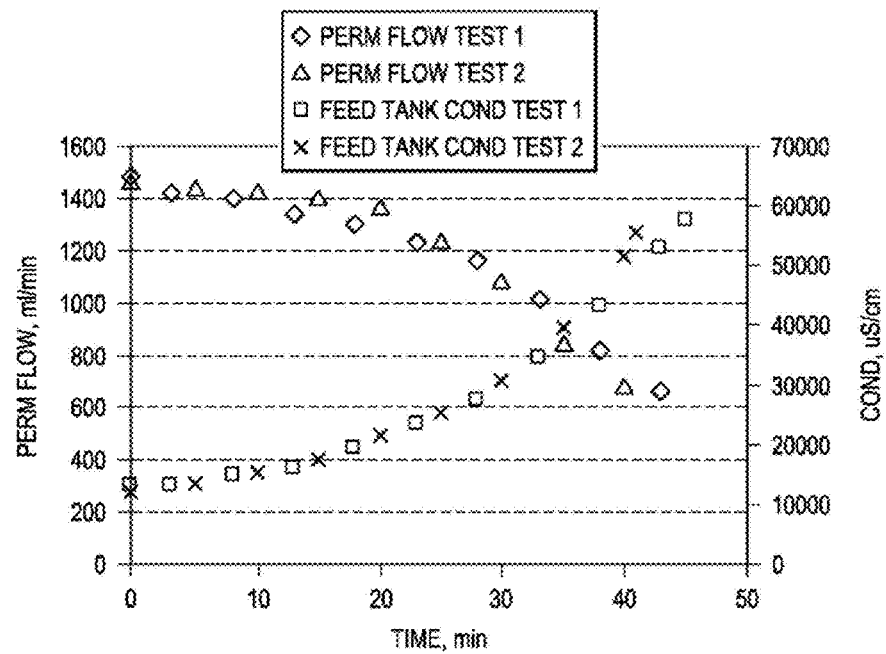
FIG. 2 is a plot of the flow rate vs. concentrate conductivity over time for Example 1.

Procedure: Run 1 was started with 15 gallons of plant RO concentrate, to which 0.3 mls of Pretreat Plus-0400 antiscalant was added, and concentrated sulfuric acid was added to lower the pH to 3.7-4.0. The concentrate was further concentrated with about 93% recovery of permeate (14 gallons) using a 700 psi pump pressure over about 42 minutes. The permeate flow rate vs. concentrate conductivity over time are plotted and is shown in FIG. 2.

Observations: No turbidity or precipitation was visible in the resulting super-concentrate. The absence of fouling of the membrane was indicated by two facts. One, the fall-off of the permeate flow rate was smooth coinciding with the gradual increase in the osmotic pressure exerted by the concentrate against the 700 psi pressure of the concentrating pump. Secondly, to refresh membrane for another run, brief flushing with the collected permeate fully restored the initial membrane flux. The conductivity of the collected permeate after stirring to mix were 203 and 263 microS/cm for the replicate runs. The corresponding super-concentrate conductivities were 56,200 and 60,800, respectively, representing average salt passage of about 0.4%.

EXAMPLE II

Figure 3:
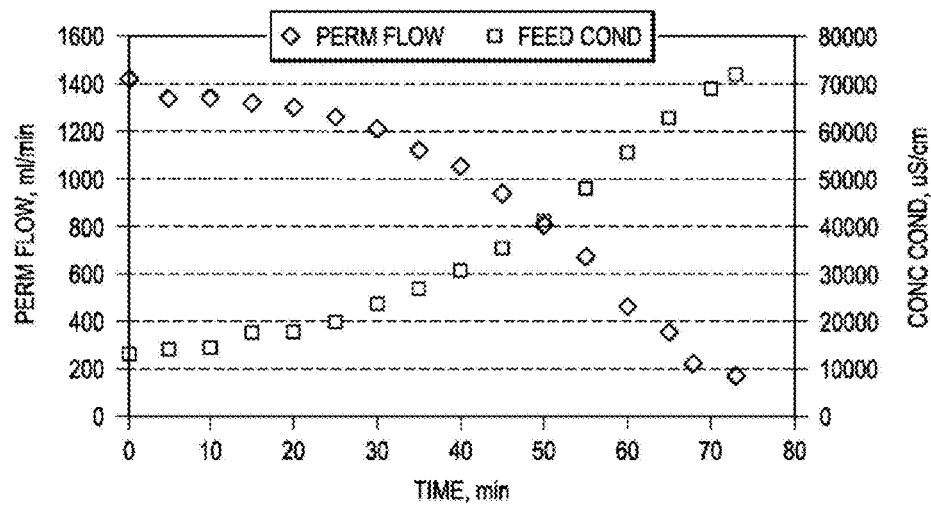
FIG. 3 is a plot of the flow rate vs. concentrate conductivity over time for Example 2.

Procedure: The same conditions of Run 1 above were repeated, the run time was extended to 73 minutes. Starting volume of the plant RO concentrate was 20 gallons. The permeate flow rate and concentrate conductivity over time are plotted as shown in FIG. 3.

Observations: Again, the super-concentrate showed no visible turbidity or precipitation. A total of 19.35 gallons of permeate produced from 20 gallons of plant RO (primary RO) concentrate represents 96.8% recovery in the secondary seawater RO. The final mixed permeate had a conductivity of 450 microS/cm and the concentrate 71,900 microS/cm. The average salt passage in this run is 0.6%.

EXAMPLE III

Figure 4:
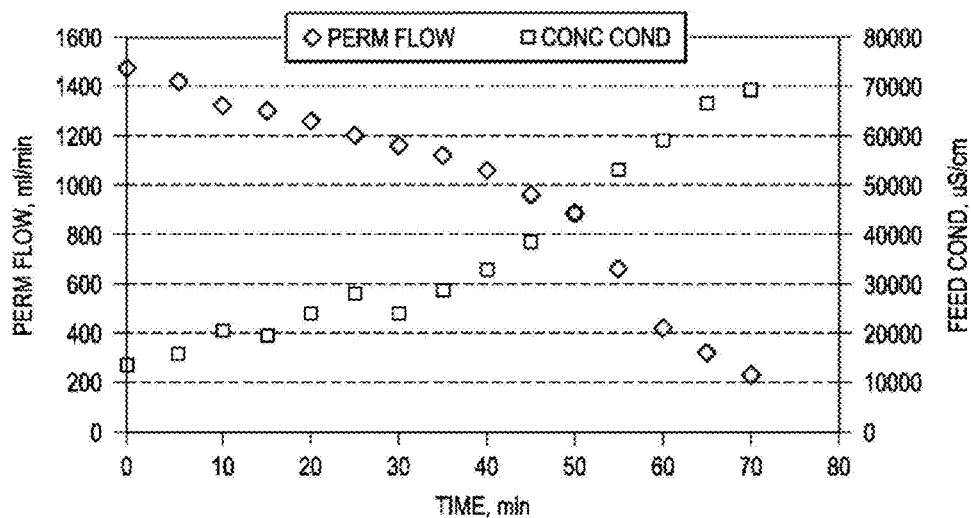
FIG. 4 is plot of the flow rate vs. concentrate conductivity over time for Example 3.

Procedure: The run started with 10 gallons of plant RO concentrate and 1.0 ml of Pretreat Plus-0400, followed by two 5-gallon increments of plant RO concentrate at 10 minutes and 25 minutes time points, each time adjusting the pH to 3.7-4.2 with concentrated sulfuric acid. The permeate flow rate at 700 psi and concentrate conductivity over 70 minutes are plotted as shown in FIG. 4.

Observations: Again, the super-concentrate showed no visible turbidity or precipitation, and the membrane showed no evidence of fouling by silica. A simple flushing of the system with RO permeate water cleaned the membrane which retained the original productivity (840 mils/minute at 300 psi). From the initial 20 gallons of plant RO concentrate, the final mixed permeate volume was 18.05 gallons (500 microS/cm) and the final concentrate volume was 1.34 gallons (71,500 microS/cm). This represented an apparent recovery of 93% and average salt rejection of 99.3%. Reactive silica (by Hach molybdate assay) in the super-concentrate was measured in triplicate as 870, 790 and 810 mg/l.

EXAMPLE IV

Procedure: The run started with 10 gallons of plant RO concentrate and 1 ml of Pretreat Plus-0400, followed by three 5 gallon increments of plant RO concentrate at 7, 17, and 27 minute time points, each time adjusting to pH 3.1 to 3.3 range with concentrated sulfuric acid, The permeate flow rate at 700 psi and concentrate conductivity over 102 minutes showed similar gradual fall off of permeate flow rate of 1350 this/minute to 80 mls/minute, while the concentrate conductivity increased from 13,810 to 82,600 microS/cm.

Observations: Again, the super-concentrate showed no visible turbidity or precipitation, and the membrane showed no evidence, of fouling by silica. A simple flushing of the system with RO permeate water cleaned the membrane which retained the original productivity (840 mls/minute at 300 psi), From the initial 25 gallons of plant RO concentrate, the final mixed permeate volume was 23.52 gallons and final concentrate volume was 1.27 gallons (82,600 microS/cm). This represented an apparent recovery of 95%. Reactive silica profile (by Hach molybdate assay) in the concentrate was measured as 110 and 115 mg/l at start, 340 and 390 mg/l at 52 minutes, and 880 and 980 mg/l at 92 minutes.

EXAMPLE V

Figure 5:
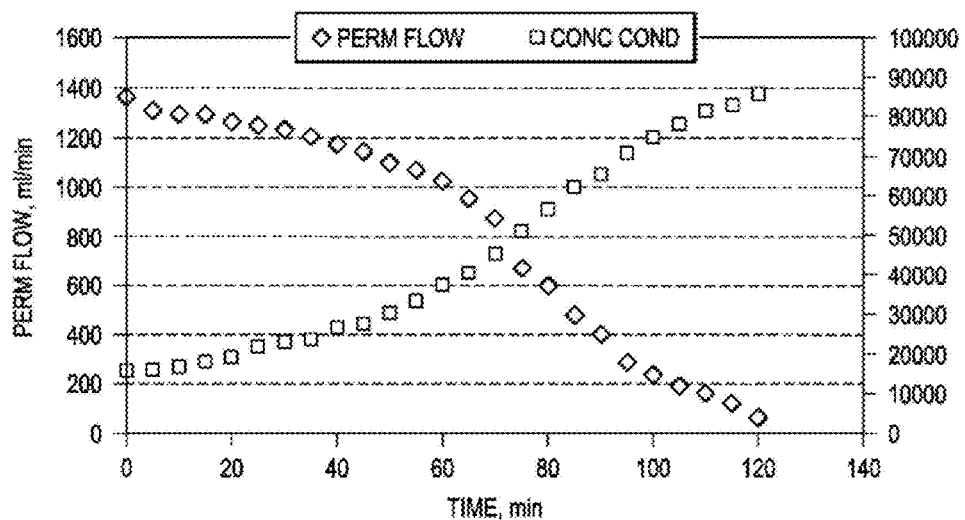
FIG. 5 is plot of the flow rate vs. concentrate conductivity over time for Example 5.

Procedure: The run started with 30 gallons of plant RO concentrate and 0.3 ml of Pretreat Plus-0400, adjusting to pH 3.65 with concentrated sulfuric acid. The permeate flow rate at 700 psi (accidently increasing to 740 psi after 70 minutes) and concentrate conductivity over 120 minutes showed similar gradual fall off of permeate flow rate of 1360 mls/minute to 68 mls/minute, while the concentrate conductivity increased from 15,740 to 86,100 microS/cm. The permeate flow rate and concentrate conductivity over 120 minutes are plotted in FIG. 5.

Observations: Again, the super-concentrate showed no visible turbidity or precipitation, and the membrane showed no evidence of fouling by silica. A simple flushing of the system with RO permeate water cleaned the membrane which retained the original productivity (840 mils/minute at 300 psi). From the initial 25 gallons of plant RO concentrate, the final mixed permeate volume was 27.43 gallons and final concentrate volume was 2.38 gallons (86,100 microS/cm). This represented an apparent recovery of 92%. Reactive silica profile (by Hach molybdate assay) in the concentrate was measured as 110 mg/l at start, 260, 255, and 285 mg/l at 55 minutes, and 700, 780, and 780 mg/l at 105 minutes. The total dissolved solids in the super-concentrate were determined by drying in the oven. The results were: 73,880, 73,175, and 72,475 (average: 73,183 mg/l).

Figure 6:
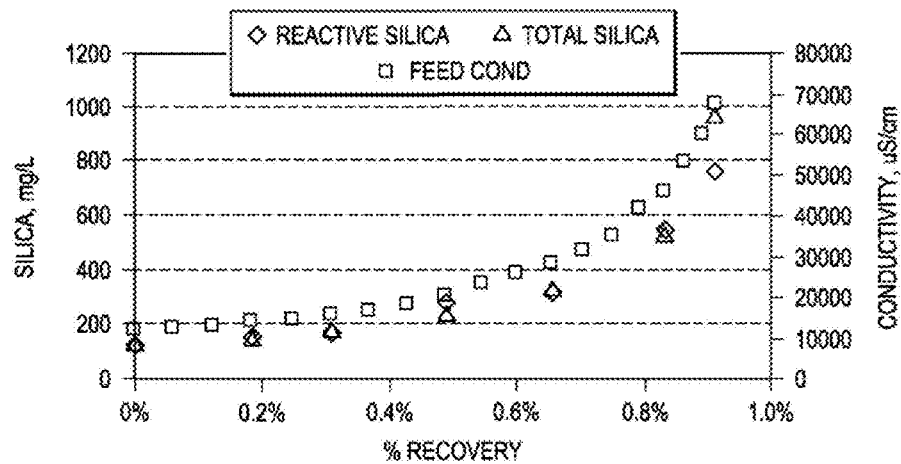
FIG. 6 is a plot of the conductivity, reactive silica, and total Silica of the feed water vs. the % recovery.

Silica concentration profile in the process: During the design phase of the current RO plant, the inventors showed that in the pilot studies silica was the limiting foulant for water recovery between 85-90%. Now, using the effect of acidification of the primary RO concentrate in synergy with the antiscalant to inhibit the polymerization of reactive silica which triggers fouling, the inventors have for the first time in RO process designed a chemical control that can circumvent the fouling effects of high silica concentrations in brackish water. It is of interest to clearly document the concentration profiles of reactive and total silicas whose effects on RO membranes apparently have been completely controlled. A composite picture of the silica profile in this process is given in Table 2 and are shown in FIG. 6.

TABLE 2

Feed Conductivity and Silica versus Percent Recovery.

| Percent Recovery (%) | Feed Conductivity (uS/cm) | Reactive Silica (mg/L) | Total Silica (mg/L) |
|---|---|---|---|
| 0 | 11,690 | 123 | 130 |
| 18.6 | 13,760 | 153 | 149 |
| 31.0 | 15,340 | 172 | 179 |
| 48.8 | 19,780 | 280 | 235 |
| 65.6 | 28,300 | 318 | 328 |
| 83.2 | 45,700 | 545 | 528 |
| 91.3 | 67,400 | 765 | 965 |

Table 2 shows the conductivity of the feed water along silica concentrations at various point in a batch run (the total silica concentration was calculated from silicon concentrations measured using Inductively Coupled Plasma, ICP, Spectroscopy). The data shows that reactive silica and total silica concentrations were almost exactly the same for all recoveries except the last one at 91.3%. The difference is due to polymerization of the silica (which would not show up in the reactive silica measurement).

Figure 7:
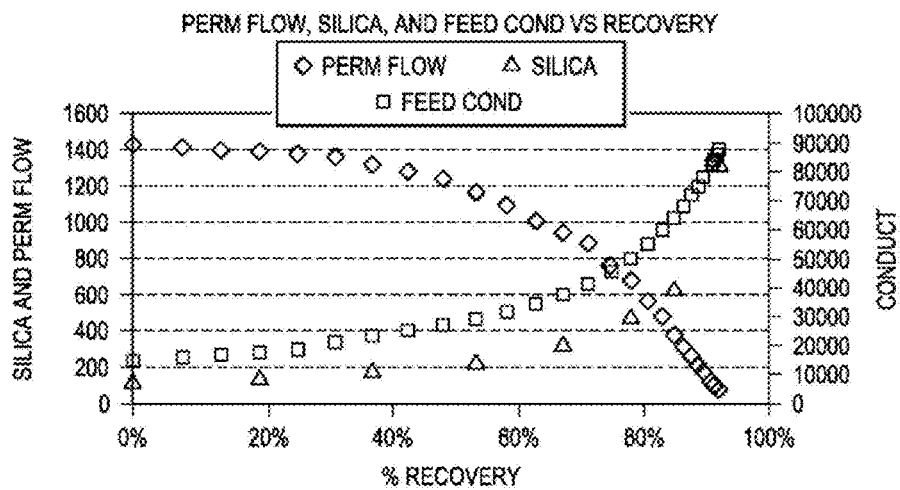
FIG. 7 is a plot of permeate flow, feed conductivity, and reactive silica concentration in the feed water for a typical test run vs. the % recovery.

The performance of the system was excellent, with no precipitation of salts until the recovery reached about 92%. FIG. 7 is a plot of permeate flow, feed conductivity, and reactive silica concentration in the feed water for a typical test run (all silica concentrations in this disclosure are reactive silica unless noted otherwise). The decrease in permeate flow rate was due to the increase in the osmotic pressure of the feed solution as it became more concentrated. The final conductivity of the feed solution was 87,000 gS/cm at a recovery of 92%. Salt(s) began to precipitate just before the test was stopped. The silica concentration in the feed solution was over 1300 mg/L, which is more than 400 mg/L higher than any of the silica concentrations measured in previous runs.

FIG. 8 is a plot of silica concentration versus recovery for nine different runs. These data were combined and plotted to obtain a least squares equation as shown in FIG. 9. The measured and calculated silica concentrations for nine different runs are plotted in the graph and they are very close until about 80% recovery, after which the values begin to diverge. This is because the silica begins to polymerize at about that point and the test that measures reactive silica (HACH molybdate assay) does not measure polymeric silica. This explanation is supported by the data in Table 3 which shows the reactive silica concentrations and total silica concentrations for one run where total silica was measured by Inductively Coupled Plasma (ICP) Spectroscopy. The reactive and total silica concentrations were about the same up to 80% recovery, but at 91% the total silica concentration is more than 26% higher than the reactive silica concentration. As stated previously, this is the recovery range where salt precipitation begins, so it is likely that approximately 90% recovery is about as far as the seawater RO process can go in recovering additional water from KBH concentrate.

TABLE 3

Reactive Silica and Total Silica (by ICP).

| Recovery | Reactive Silica (mg/L) | Total Silica (mg/L) | % Difference |
|---|---|---|---|
| 0 | 123 | 130 | 5.8% |
| 18.6% | 153 | 149 | -2.5% |
| 31.0% | 172 | 179 | 4.0% |
| 48.8% | 225 | 235 | 4.3% |
| 65.6% | 318 | 328 | 3.2% |
| 79.3% | 525 | 528 | 0.5% |
| 91.3% | 765 | 965 | 26.2% |

Full scale SWRO system: Following the successful tests of the small SWRO unit, a larger fully automated batch-treatment system was installed and tested. A schematic of the system is shown in FIG. 10.

The system had four 4"×40" GE-Osmonics desal membranes in a parallel single stage configuration. The concentrate feed tank and permeate collection tank are 300-gallon cone-bottom plastic tanks on metal stands. The high pressure positive displacement feed pump discharged 32 gpm at 1,200 psi and produce up to 6 gpm of permeate at the normal operating pressure of 700 psi. The system includes numerous sensors for measuring pH, permeate and concentrate flow rates, pressures, temperatures, and conductivities, The readings are data-logged at one minute intervals and were stored on a computer that is accessible at all times via the internet.

Figure 10:
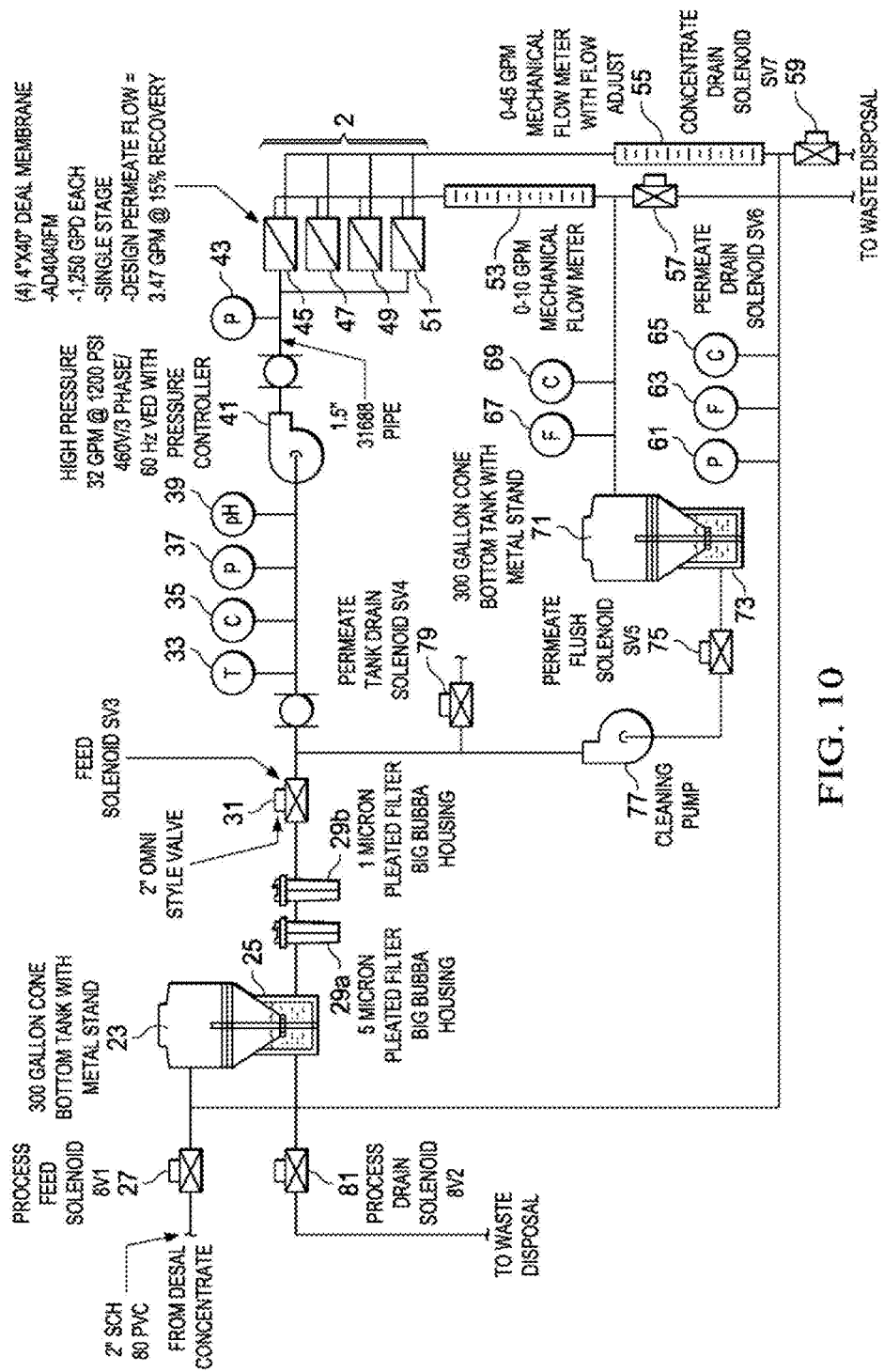
FIG. 10 is a schematic of a full scale automated batch treatment seawater RO system.

FIG. 10 is a schematic of a full scale SWRO system. Feed tank 23 is mounted on a metal stand 25 and it receives the RO concentrate, the flow of which is regulated through a solenoid valve 27. From the feed tank 23, the concentrate flows through 5μ and 1μ prefilters 29a and 29b. Solids and other wastes are removed and sent to the waste disposal through solenoid valve 81. The filtered feed is sent to a high pressure pump 41, through a feed solenoid valve 31. The temperature, conductivity, pressure, and the pH of the feed flowing to the pump 41 is monitored through sensors 33, 35, 37, and 39, respectively. The feed is then passed through a membrane unit 2 comprising four membranes 45, 47, 49, and 51 arranged in a parallel single stage configuration. A pressure sensor 43 monitors the pressure of the feed passing through the membrane. The feed after passing through the unit 2 is split into two streams. The first stream flow rate of which is measured by a flow meter 55 splits into two: (i) the waste stream regulated by a solenoid valve 59 and (ii) recirculation stream which is fed back to the feed tank 23. The pressure, flow, and conductivities of the recirculation feed is measured by sensors 61, 63, and 65, respectively. The flow rate of the second stream is monitored by a flow meter 53 and it further splits into two: (i) the waste regulated by valve 57 and (ii) permeate which flows to permeate tank 71, mounted on a metal stand 73. The flow and the conductivity of the permeate feed is measured by sensors 67 and 69, respectively. Part of the permeate from the permeate tank 71 is passed through a cleaning pump 77, through solenoid valve 75, and is allowed to drain through drain solenoid valve 79.

Table 4 shows the characteristics of the initial KBH concentrate, the total permeate, and the final concentrate from a run that was set for 80% recovery. The TDS of the total permeate is very, low at less than 200 mg/L, rendering the water very blendable. The iron concentration in the final feed is higher than it should be based on the calculated theoretical concentration for 80% recovery, indicating that iron is being picked up somewhere in the treatment system itself. All of the other parameter concentrations are about as expected, indicating that the system performed as anticipated from the results obtained with the smaller SWRO pilot unit.

TABLE 4

Characteristics of initial feed, permeate, and final concentrate.

| Parameter | KBH Conc | Permeate | Final Feed |
|---|---|---|---|
| Calcium | 274 | <10 | 1432 |
| Iron | 0.14 | <0.02 | 5.5 |
| Magnesium | 92.2 | 1.5 | 438 |
| Potassium | 48 | <2 | 216 |
| Sodium | 1910 | 44.7 | 8640 |
| Chloride | 5520 | 126 | 26600 |
| Sulfate | 1230 | 9.8 | 8140 |
| Elec Cond | 19900 | 902 | 99000 |
| TDS | 11200 | 164 | 57800 |
| pH | 7.8 | 3.2 | 3.6 |
| Silica | 126 | <5 | 728 |

The inventors also studied the effect of other variables in conjunction with a vibratory process and SWRO studies, including the effect of pH on water recovery, the effectiveness of an antiscalant for inhibiting sulfate precipitation, and the effect of feed water temperature on the capital cost of the seawater system.

Figure 11:
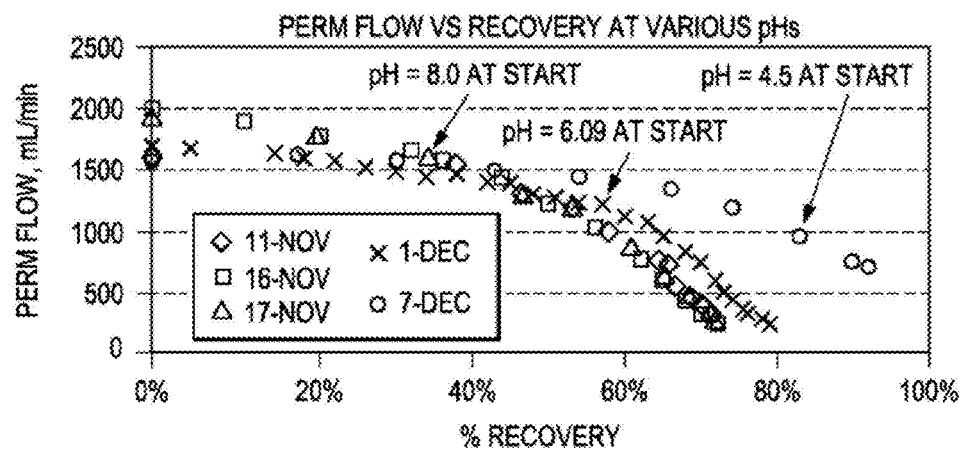
FIG. 11 is a plot showing the effect of pH on water recovery from RO concentrate.

Effect of pH on Recovery: In order to evaluate the effect of pH on water recovery from RO concentrate, the pH was adjusted to 8.0, 6.09, and 4.5 and fed into a vibratory process unit until precipitation began. The results are shown in FIG. 11. The data clearly showed that as the pH was reduced, the recovery increased before precipitation occurred.

Antiscalant and Acid Evaluation: In conventional membrane processes, water recovery from brackish water solutions is limited, by precipitation of the least soluble salt. In the case of KBH concentrate, electron microscopic analysis of the solids that precipitated from highly concentrated RO concentrate revealed that the solids were primarily calcium sulfate. The seawater RO process that was used in this study required that the pH of the feed solution be reduced from about 8.0 to below 4.0. Two commonly used acids for doing so are hydrochloric and sulfuric. Hydrochloric acid has the advantage of not adding sulfates to the treated water, but it is harder to handle (because of its tendency to fume) and it is only one third the strength of sulfuric acid. Conversely, sulfuric acid does not fume and is less expensive than hydrochloric acid. In order to determine if the type of acid used to lower the pH would significantly affect the point where calcium sulfate precipitation would occur, laboratory tests were conducted wherein the recovery was simulated in KBH concentrates that were treated with each type of acid. Various amounts of calcium chloride and sodium sulfate were added to vigorously-stirred solutions of KBH concentrate and then checked for salt precipitation by measuring the turbidity of the solutions. In addition to evaluating the effect of acid type on calcium sulfate precipitation, an antiscalant intended to inhibit calcium sulfate precipitation was also tested. The antiscalant Pretreat Plus 0400 that is available through King Lee Technologies was used in the evaluation. It was added at 5 ppm to two samples of KBH concentrate that had the pH reduced to 3.5, one with sulfuric and the other with hydrochloric acid.

Figure 12:
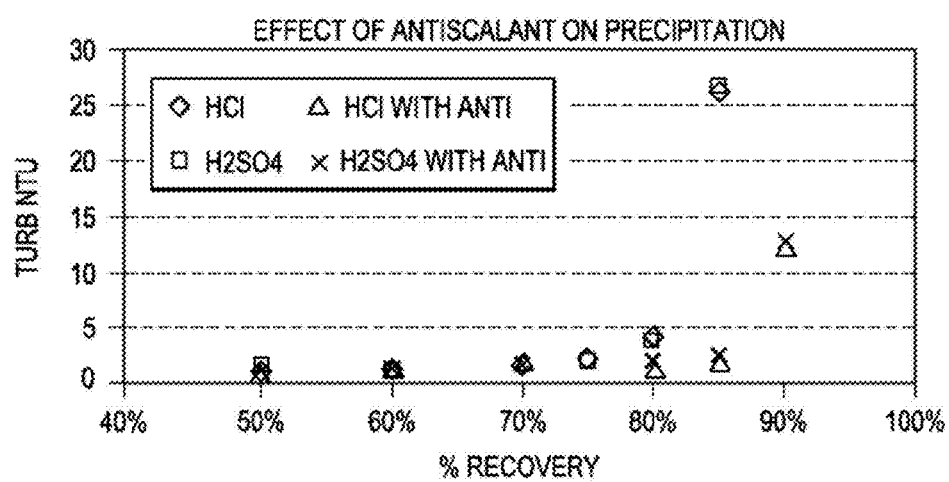
FIG. 12 is a plot showing the effect of acids and antiscalant on calcium sulfate precipitation.

The results of the tests are plotted in FIG. 12. The graph shows that precipitation occurred at approximately 80% recovery in each of the acid-only solutions. The law of mass action dictates that the solution having the higher sulfate concentration should precipitate first, but the 5% Increments in recovery that were utilized in the testing protocol were apparently not precise enough to detect the difference in precipitation points. In any case, for our purposes, the advantages that sulfuric acid has over hydrochloric acid (including a huge cost differential) would favor using sulfuric acid for reducing the pH of the feed solution.

When the antiscalant was added in addition to the acid, the results show that the antiscalant did indeed allow for more recovery of water from the concentrate before precipitation began. Regardless of which acid was used is pretreating the concentrate, precipitation did not occur until a recovery of about 86% was achieved. The difference between 80% and 86% recovery represents only a 6% increase in recovery of water, but perhaps more significantly for inland systems, it represents a 30% reduction in the volume requiring final disposal. This would obviously have a meaningful impact on the cost of concentrate management when evaporation is used for disposal of the final concentrate. Thus, the use of the antiscalant for inhibiting calcium sulfate precipitation in the KBH concentrate appears to be well founded.

In addition to the lab-scale testing of the effectiveness of the antiscalant, comparative tests were conducted at the pilot plant site by running KBH concentrate through both a vibratory process and the seawater RO units with and without antiscalant treatment. The pilot scale results showed that more water could be extracted from the concentrate when using the antiscalant. That is, without the antiscalant, precipitation generally occurred at conductivities below 64,000 μS/cm, which corresponds to a recovery of between 70% and 85%, depending on the strength of the concentrate at the beginning of the test. When the antiscalant was used, concentrate conductivities of over 75,000 µS/cm were attained without precipitating anything from the feed solution (in one test, the conductivity of the final concentrate was over 86,000 µS/cm). Thus, the pilot scale results confirmed the laboratory tests, demonstrating that the antiscalant was very effective at inhibiting calcium sulfate precipitation.

Process Economics: In considering the economics of the batch-treatment SWRO concentrate recovery process, the values used in the calculations are, at best, reflective of the costs at a certain place and at a given point in time. Nevertheless, similar projects at other locales would have much in common with this project, so the cost estimates obtained here should represent a good guide as to what to expect in similar projects at other places, especially after prudent adjustments for time and place have been made. The calculations that follow do not include other technology because the capital cost of the system would be at least five times more than a comparably-sized SWRO system. Furthermore, a vibratory process technology is best used for feed waters that contain suspended solids and that was not the case in this project.

The values associated with the parameters used in deriving the costs for a full-scale project are shown in Table 5. Cost-related components that are not included in this project but may have to be included in projects considered elsewhere are land costs, pipeline costs, and solids disposal costs. These components are not included herein because of circumstances that may be unique to this project, but their impact on total costs will be discussed below.

TABLE 5

Values used in calculating cost of water recovered from RO concentrate.

| Item | Value |
| --- | --- |
| Initial RO conc volume (gpd) | 3,000,000 |
| Interest rate (%) | 5% |
| Evap rate (in/yr) | 50 |
| Liner cost, $/sq ft | 0.60 |
| Liner life, yrs | 20 |
| Excavation, $/cu yd | $3.00 |
| Fence, $/LF | $10.00 |
| Flow storage, mos | 6 |
| Excavation & fence amortzin time, yrs | 20 |
| Equipment life, yrs | 20 |
| Water selling price, $/1,000 gal | $2.00 |
| Blending well depth, ft | 300 |
| Blending ratio (total vol/RO perm) | 1.5 |
| SWRO membrane life | 5 |
| RO capital cost, $/MGD | $700,000 |
| Power cost, $/kw-hr | $0.08 |
| Pump & Motor efficiency, % | 75% |
| Buildings, $ | $320,000 |
| RO membrane cost, $/sq ft | $2.00 |
| SWRO flux, gpd/sq ft | 15 |
| SWRO operating pressure, psi | 700 |
| Antiscalant, $/9 lb gallon | $11 |
| H$_2$SO$_4$, $/gal | $2.53 |
| H$_2$SO$_4$ feed rate, mL/gal | 1.0 |
| Personnel cost, $/yr 6 @ $35,000 | $210,000 |
| Contingencies, $/yr | $200,000 |

Figure 13:
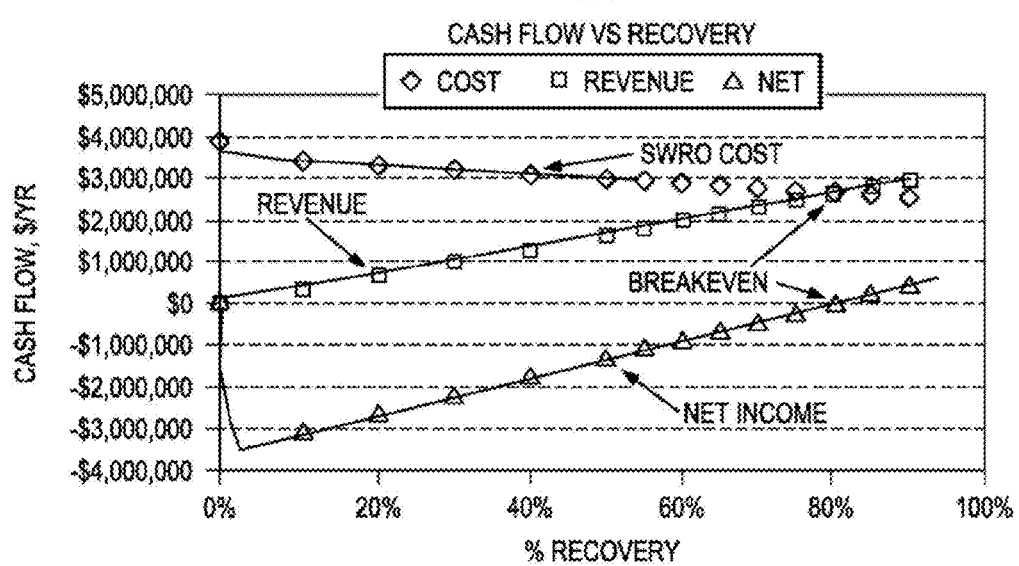
FIG. 13 is a plot of the SWRO costs and ash flow vs. the water recovery.

The results of the cost calculations as a function of water recovery are shown in FIG. 13. The breakeven point occurs at a recovery a little above 80%. At recoveries above the breakeven point, there is positive cash flow to the utility.

The values associated with the various recoveries are shown in Table 6. At a recovery of 85% (which has been shown to be feasible for this project), the cost of the recovered water would be $1.87 per thousand gallons and the utility would have a positive cash flow of $178,000 per year. The net positive cash flow at 90% would be over $400,000 per year. Inclusion of items that were not considered here such as land cost would add about $0.05 per thousand gallons of product water for each $1 million of capital cost.

In addition to the positive cash flows associated with the project, there would be an extra 3.8 MGD of drinking water produced from the RO concentrate that would otherwise be thrown away (at additional cost). Thus, a batch-treatment seawater reverse osmosis system for recovering water from the RO concentrate at the KBH Desalination plant appears to be very attractive from an economic point of view.

TABLE 6

Product water costs as a function of percent recovery.

| Recovery % | Product Water Cost ($/1,000 gal) | Net Revenue, ($/yr) |
| --- | --- | --- |
| 0 | | 0 |
| 10% | $22.50 | −$3,367,933 |
| 20% | $10.81 | −$2,895,492 |
| 30% | $6.92 | −$2,422,983 |
| 40% | $4.97 | −$1,950,393 |
| 50% | $3.80 | −$1,477,701 |
| 55% | $3.37 | −$1,241,306 |
| 60% | $3.02 | −$1,004,872 |
| 65% | $2.72 | −$768,391 |
| 70% | $2.46 | −$531,852 |
| 75% | $2.24 | −$295,240 |
| 80% | $2.04 | −$58,532 |
| 85% | $1.87 | $178,311 |
| 90% | $1.72 | $415,365 |

For the El Paso KBH Desalination RO plant, the present invention represents a first step towards the development of a process to greatly reducing the volume of RO reject that has to be disposed and by an alternate method without using deep well injection. Very beneficial is the visualization of the use of sequential ROs in tandem to concentrate all brackish well waters continuously to the maximum limits of 1,000 to 1,200 psi seawater RO, at nearly 100% water recovery rates where the resulting osmotic pressure in the concentrate cannot be overcome. These results show in principle that a non-stop tandem RO process with near complete water recovery is possible. The super-concentrate resulting from such a process would still be brines that contain less than 10% by weight of dissolved salts. Such salt concentrations will facilitate the fractionation of less soluble calcium and magnesium salts from the more soluble sodium and potassium salts of some commercial value. The economics of zero-liquid-discharge from large inland municipal waterworks can be made feasible, and the control of salinity influx from the use of river waters such as exists in the arid southwestern US dealt with.

Synergistic effects of antiscalants and acids allow for non-stop recovery of pure water from brackish sources using a seawater RO system following a primary RO. The tandem RO system of the present invention is capable of recovering pure water to the limits of backflow osmotic pressures resulting from the use of 1,000-1,200 psi feed water pumps driving against it.

The batch-treatment seawater RO system of the present invention is very effective for recovering most of the water (i.e., 85-90%) from the concentrate of the brackish groundwater reverse osmosis treatment system at the KBH desalting plant in El Paso, Tex. With proper pH control and antiscalant dosage, the batch-treatment SWRO system of the present invention can be used to recovery water from silica-saturated RO concentrate without fouling the membranes. Silica concentrations of over 1,000 mg/L are attainable with relatively minimal pre-treatment of the silica-saturated feed solution. A vibratory process technology can be used to recover water from silica-saturated RO concentrate, but a SWRO system of the present invention is much more attractive from a capital cost and system-maintenance point of view.

Figure 14:
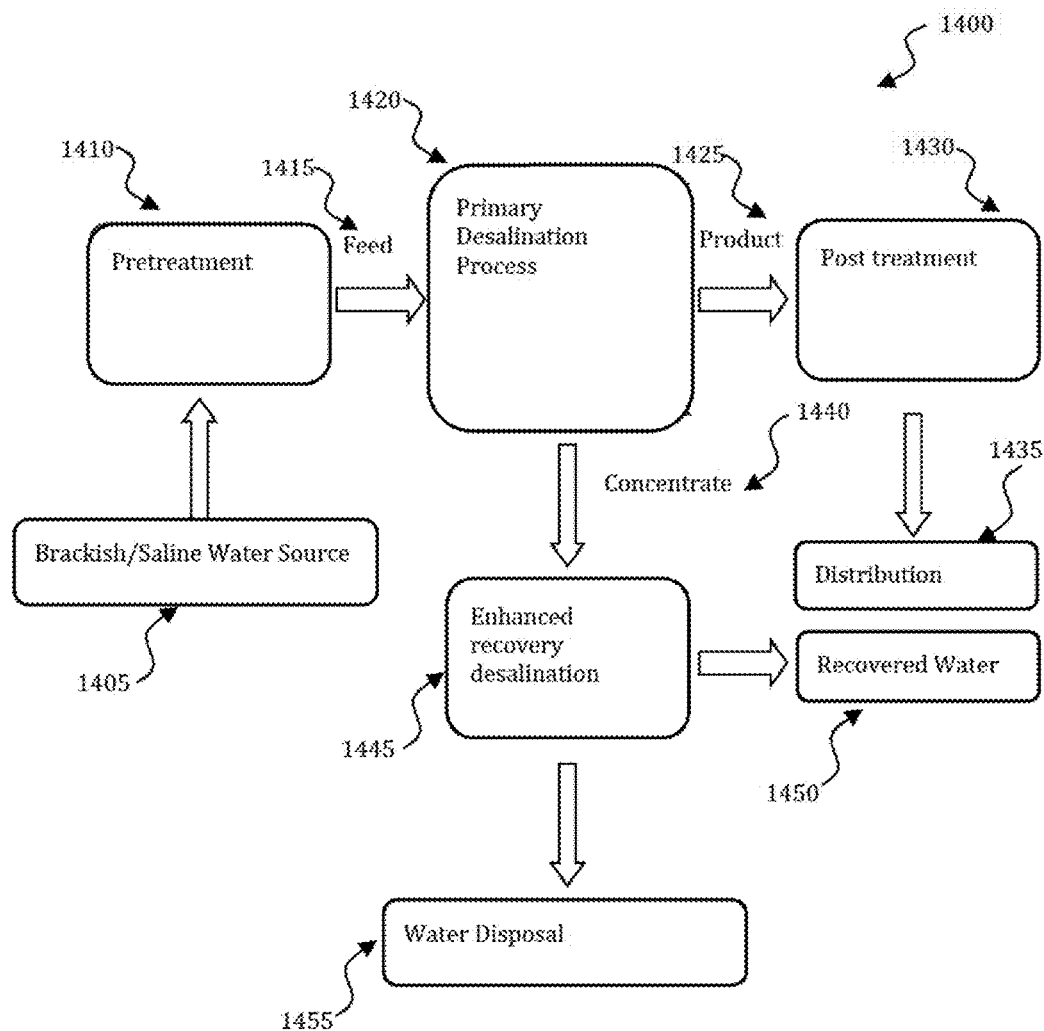
FIG. 14 depicts a system for water recovery in accordance with the disclosed embodiments.

In certain embodiments, methods and systems are described for concentrate enhanced recovery reverse osmosis. FIG. 14 illustrates an embodiment of such a system 1400. In the embodiment, brackish or saline water from a brackish or saline water source 1405 is provided to an optional pretreatment 1410. The feed water 1415 from the pretreatment stage 1410 is then subject to a standard desalination process at 1420. The standard desalination process 1420 results in some product water 1425 that may be subject to post treatment 1430 before distribution at 1435. The primary desalination process also produces concentrate 1440 which can be subject to a concentrate enhanced recovery reverse osmosis system 1445 as shown. The enhanced recovery 1445 can result in additional recovered water 1450 and waste 1455. The embodiments operate by exploiting the kinetics of precipitation in the concentrate enhanced recovery reverse osmosis stage 1445.

In particular, crystals can form in certain supersaturated solutions. Those crystals adversely affect the semi-permeable membranes characteristic in a reverse osmosis system. However, when a solution is supersaturated, it takes some time for the first crystals to form and precipitate. This lag period is known as the induction time.

Figure 15:
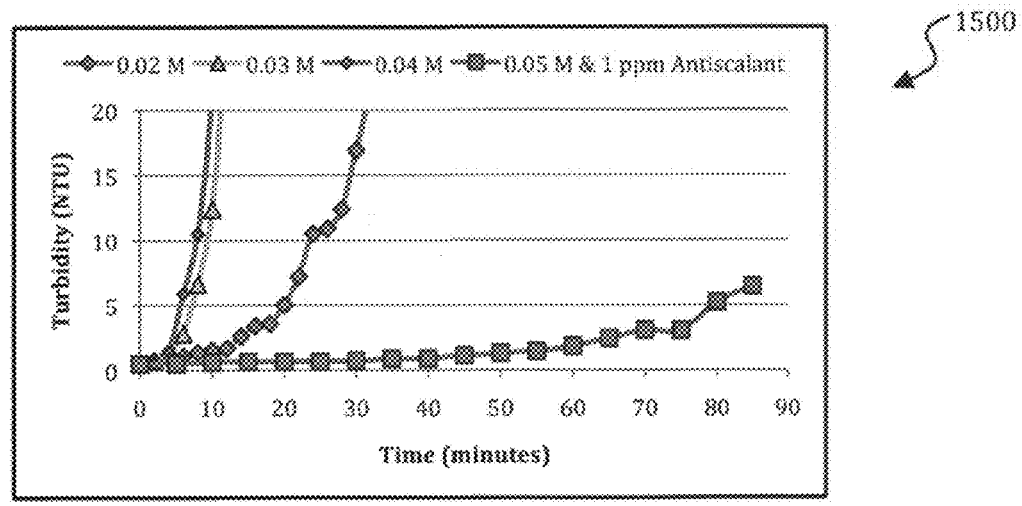
FIG. 15 depicts a chart of turbidity as a function of time in accordance with the disclosed embodiments.

FIG. 15 provides a chart 1500 that illustrates the increase in the turbidity of a supersaturated calcium sulfate solution due to precipitation of gypsum as a function of time. The induction time is shorter for solutions at higher super saturation concentrations. The induction time of gypsum can be delayed significantly by adding 1 part per million (ppm) of an antiscalant chemical.

In certain embodiments, methods and systems can be provided to improve product water recovery by taking advantage of the induction time for a given solution. In such embodiments, product water is recovered for a set duration of time in the enhanced recovery desalination stage 1445. The time is set to be slightly less than the induction time. The treatment process is then flushed with feed water or permeate to remove the potentially precipitating salts and minimize the risk of scaling in the enhanced recovery system.

The embodiments disclosed herein use reverse osmosis hardware with specifically tailored computer modules for automating control of the hardware in a dynamic set of phases. In the first phase, concentrate from an existing desalination process or system (e.g., a conventional RE) system such as the Kay Bailey Hutchison plant in El Paso is fed to the system. The embodied process is designed and operated at relatively low recovery per element (e.g., r<5% per element) with relatively high cross-flow velocity (e.g.; 13<1.15). Periodic flushing is automatically initiated at select times such that the induction time is not exceeded. Thus, the system is flushed before crystals, which may adversely affect the membranes in the system, are allowed to form. In certain embodiments, the system can further include an energy recovery device (ERD) for improved energy efficiency.

During the production phase, concentrate is subject to a single-pass through the reverse osmosis membranes (no recirculation) in the enhanced recovery system. Thus, the last/tail membrane in the vessel is subjected to the greatest risk of scaling, with minimal risk to the first/lead and middle elements. The end of the production mode can be triggered by one or more of multiple criteria. Such criteria include a specified time limit or a parameter correlated with onset of induction of chemical precipitation.

In certain embodiments, a pre-treatment phase (e.g., filtering or addition of chemicals such as antiscalants or acids) of the primary desalination concentrate upstream of the feed can be included in the process.

Figure 16:
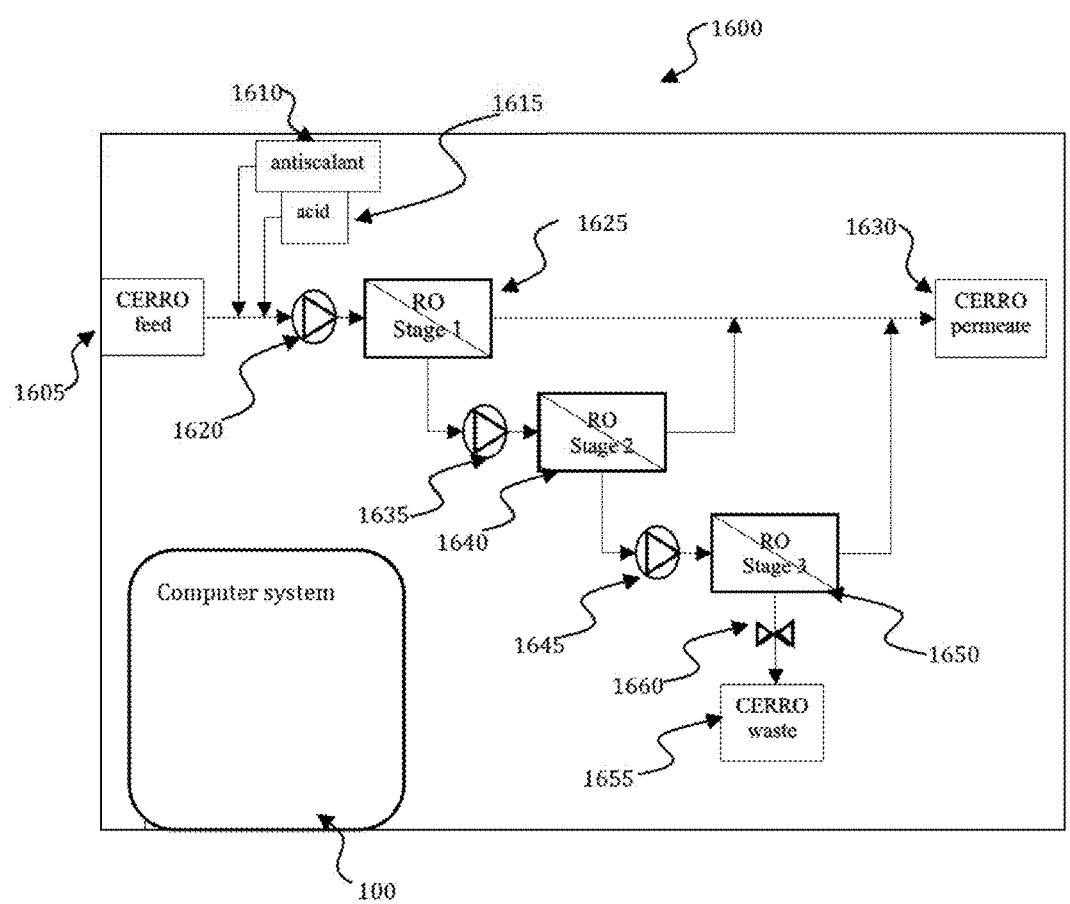
FIG. 16 depicts a block diagram of an enhanced recovery reverse osmosis system in accordance with disclosed embodiments.

FIG. 16 provides a process diagram of one embodiment of the enhanced recovery system 1600. In certain embodiments, the system can comprise 8-inch (or other sized) reverse osmosis membrane elements in a three-stage 3×2×1 vessel array with three elements per vessel. As illustrated, the feed 1605 can be treated with antiscalant 1610 and/or acid 1615 before it is pumped via pump 1620 to the first RO stage 1625. Permeate 1630 is collected from the first stage 1625 with the waste from the first stage being pumped via pump 1635 to the second stage 1640. Permeate 1630 from the second stage 1640 can be combined with the permeate 1630 from the first stage 1625 and the waste can be pumped, via pump 1645, to a third stage 1650. Permeate 1630 from a third stage 1650 can be combined with the permeate 1630 from stages one 1625 and two 1640, while the waste can be discarded at 1655 by opening valve 1660, or treated to recover water and/or minerals/salts.

It should be appreciated that each stage is operated at relatively low-recovery per element (e.g., r<5% per element) with relatively high cross-flow velocity (e.g., 13<1.15). Periodic flushing is automatically initiated by a computer system 100 at select times such that the induction time for the given stage is not met. In certain embodiments, the system can further include an energy recovery device (ERD) for improved energy efficiency.

The embodiments have been demonstrated to be effective by treating concentrate waste from an existing well-head. In certain embodiments, feed flow of over 80 gallons per minute with a feed conductivity of approximately 11,000 pS/cm can be treated, all while operating at a recovery of over 70% to produce a high quality permeate with a conductivity less than 150 pS/cm and a brine concentrate conductivity over 35,000 pS/cm.

The embodiments can be implemented with other desalination processes for improvement in overall system recovery or energy efficiency. Concentrate waste from the embodiments can be treated by membrane distillation, membrane distillation crystallization, electrodialysis, electrodialysis metathesis, capacitive deionization, membrane capacitive deionization, enhanced evaporation, etc. Embodiments can be applied to treating water for cooling tower operations in electric power plants or industrial heating/cooling operations.

Figure 17:
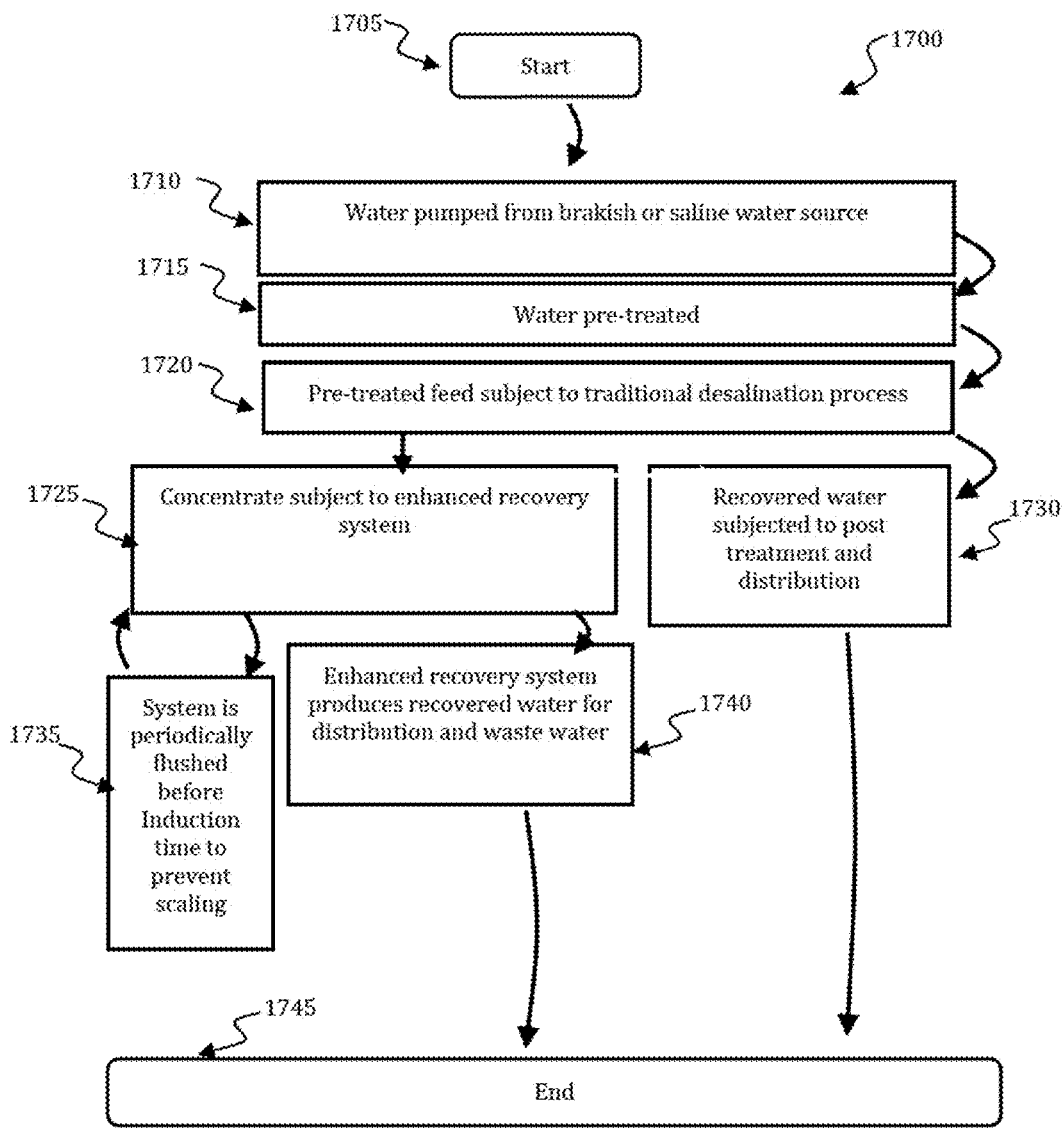
FIG. 17 depicts a flow chart illustrating a method for treating water in accordance with the disclosed embodiments.

A method 1700 for enhanced concentrate recovery via reverse osmosis is illustrated in FIG. 17 in accordance with the disclosed embodiments. The method begins at step 1705. At step 1710, water can be pumped from a brackish, saline, salt-water, or other such water source. The source water can optionally be pretreated at step 1715. This can include, for example, antiscalant or acid treatment. At step 1720, the pre-treated feed can then be subject to traditional desalination processes. The recovered water is subject to optional post treatment before distribution at step 1730. However, the concentrate from the traditional desalination is subject to enhanced recovery via an enhanced recovery system, such as the system illustrated in FIG. 16, as shown at step 1725. The enhanced recovery system produces additional product water, which may ultimately be subject to post processing and distribution, and waste water which is discarded as shown at step 1740. The system can be periodically flushed before the determined induction time in order to prevent scaling as shown at step 1735. The method ends at step 1745.

Figure 18:
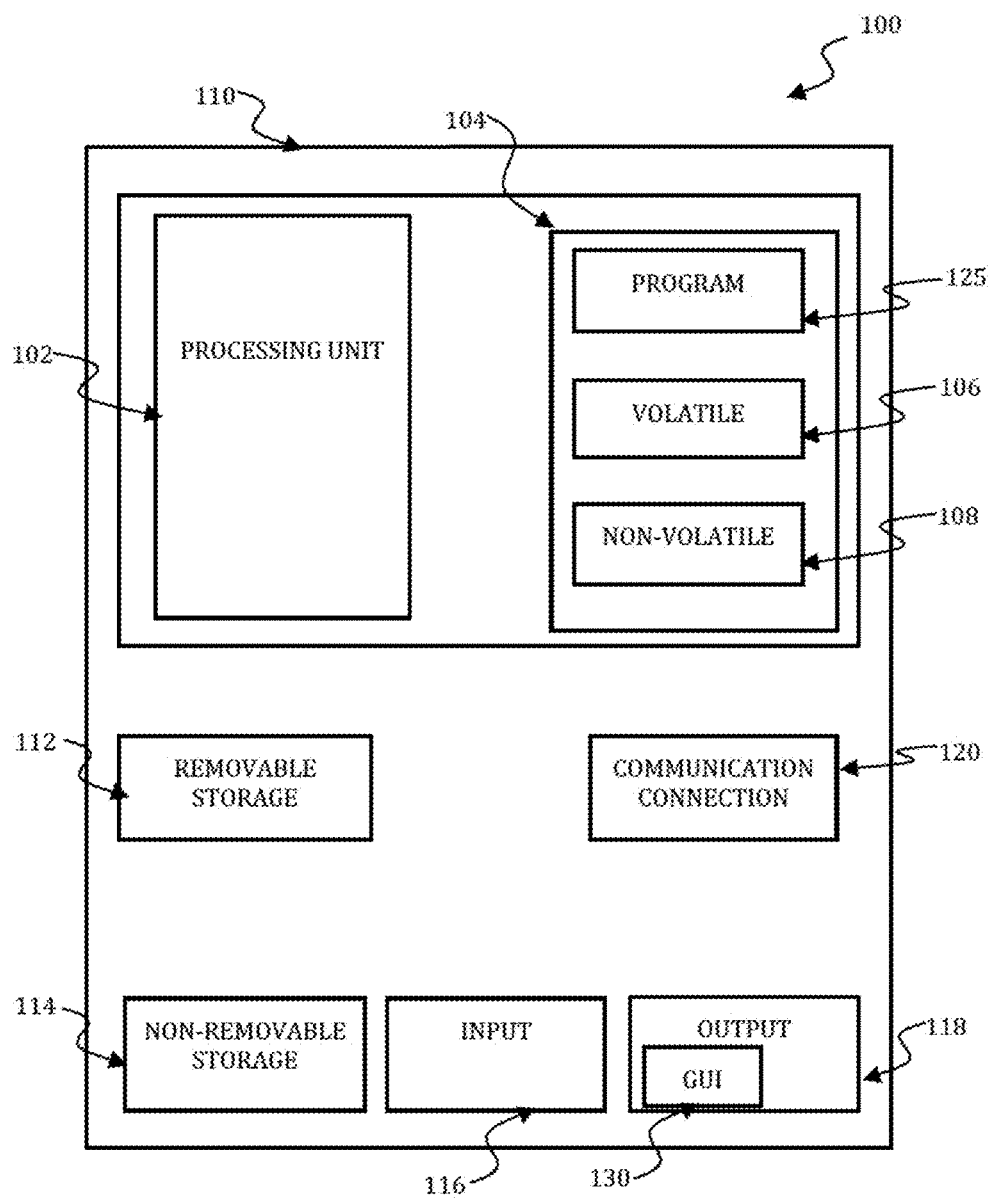
FIG. 18 depicts a block diagram of a computer system which is implemented in accordance with the disclosed embodiments.
Figure 19:
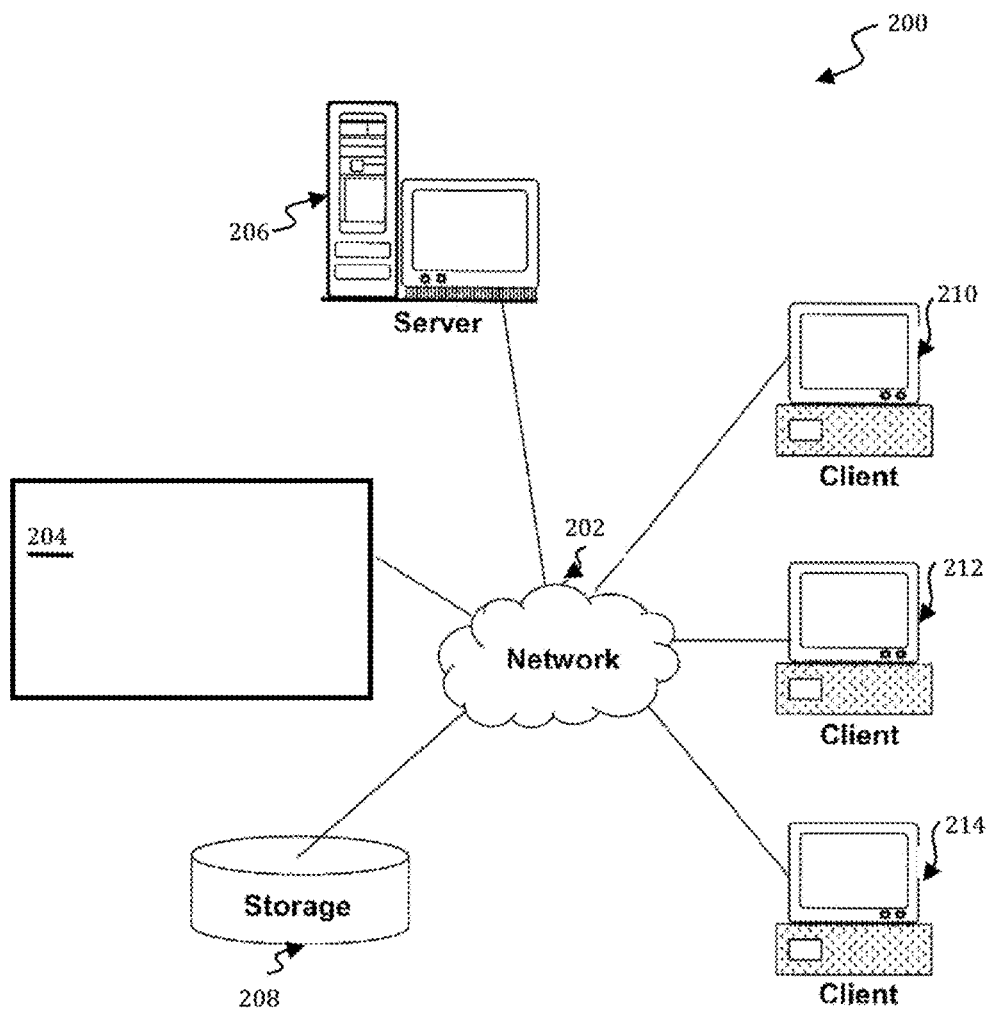
FIG. 19 depicts a graphical representation of a network of data-processing devices in which aspects of the present invention may be implemented.
Figure 20:
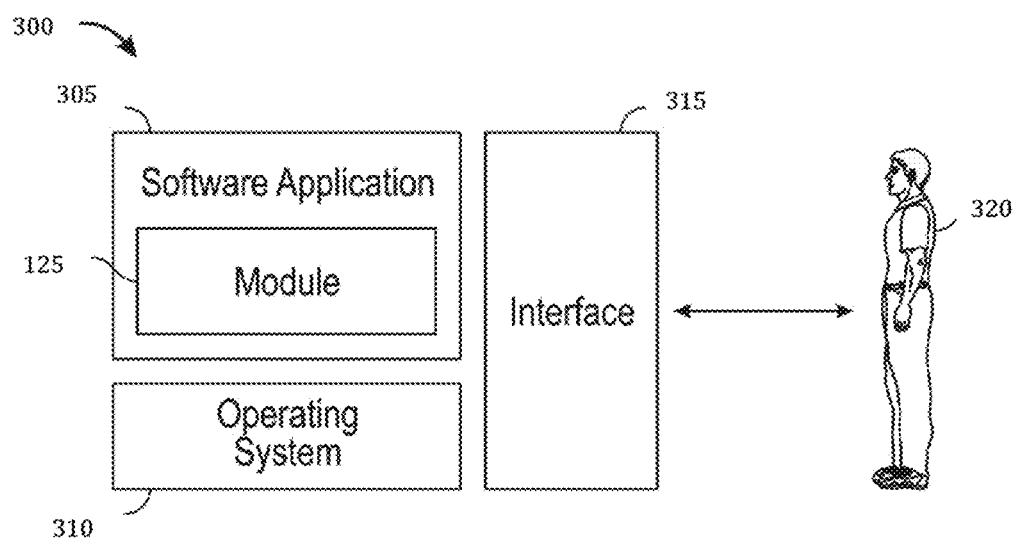
FIG. 20 depicts a computer software system for directing the operation of the data-processing system depicted in FIG. 18, in accordance with an example embodiment.

FIGS. 18-20 are provided as exemplary diagrams of data-processing environments in which embodiments of the present invention may be implemented. It should be appreciated that FIGS. 18-20 are only exemplary and are not intended to assert or imply any limitation with regard to the environments in which aspects or embodiments of the disclosed embodiments may be implemented. Many modifications to the depicted environments may be made without departing from the spirit and scope of the disclosed embodiments.

A block diagram of a computer system 100 that executes programming for implementing the methods and systems disclosed herein is shown in FIG. 18. A general computing device in the form of a computer 110 may include a processing unit 102, memory 104, removable storage 112, and non-removable storage 114. Memory 104 may include volatile memory 106 and non-volatile memory 108. Computer 110 may include or have access to a computing environment that includes a variety of transitory and non-transitory computer-readable media such as volatile memory 108 and non-volatile memory 108, removable storage 112 and non-removable storage 114. Computer storage includes, for example, random access memory (RAM), read only memory (ROM), erasable programmable read-only memory (EPROM) and electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage, or other magnetic storage devices, or any other medium capable of storing computer-readable instructions as well as data, including data comprising frames of video.

Computer 110 may include or have access to a computing environment that includes input 116, output 118, and a communication connection 120. The computer may operate in a networked environment using a communication connection to connect to one or more remote computers or devices. The remote computer may include a personal computer (PC), mobile device, server, router, network PC, a peer device or other common network node, or the like. The remote device may include a sensor, photographic camera, video camera, accelerometer, gyroscope, sensing device, tracking device, or the like. The communication connection may include a Local Area Network (LAN), a Wide Area Network (WAN), or other networks. This functionality is described in more fully in the description associated with FIG. 19 below.

Output 118 is most commonly provided as a computer monitor, but may include any computer output device. Output 118 may also include a data collection apparatus associated with computer system 100. In addition, input 116, which commonly includes a computer keyboard and/or pointing device such as a computer mouse, computer track pad, or the like allows a user to select and instruct computer system 100. A user interface can be provided using output 118 and input 116. Output 118 may function as a display for displaying data and information for a user and for interactively displaying a graphical user interface (GUI) 130.

Note that the term "GUI" generally refers to a type of environment that represents programs, files, options, and so forth by means of graphically displayed icons, menus, and dialog boxes on a computer monitor screen. A user can interact with the GUI to select and activate such options by directly touching the screen and/or pointing and clicking with a user input device 116 such as, for example, a pointing device such as a mouse and/or with a keyboard. A particular item can function in the same manner to the user in all applications because the GUI provides standard software routines (e.g., module 125) to handle these elements and report the user's actions. The GUI can further be used to display the data and metrics as discussed below.

Computer-readable instructions, for example, program module 125, which can be representative of other modules described herein, are stored on a computer-readable medium and are executable by the processing unit 102 of computer 110. Program module 125 may include a computer application. A hard drive, CD-ROM, RAM Flash Memory, and a USB drive are just some examples of articles including a computer-readable medium.

FIG. 19 depicts a graphical representation of a network of data-processing systems 200 in which aspects of the present invention may be implemented. Network data-processing system 200 is a network of computers in which embodiments of the present invention may be implemented. Note that the system 200 can be implemented in the context of a software module such as program module 125. The system 200 includes a network 202 in communication with one or more clients 210, 212, and 214. Network 202 is a medium that can be used to provide communications links between various devices and computers connected together within a networked data processing system such as computer system 100. Network 202 may include connections such as wired communication links, wireless communication links, or fiber optic cables. Network 202 can further communicate with one or more servers 206, one or more external devices such as water treatment system 204, and a memory storage unit such as, for example, memory or database 208.

In the depicted example, water treatment system 204 and server 206 connect to network 202 along with storage unit 208. In addition, clients 210, 212, and 214 connect to network 202. These clients 210, 212, and 214 may be, for example, personal computers or network computers. Computer system 100 depicted in FIG. 18 can be, for example, a client such as client 210, 212, and/or 214. Alternatively clients 210, 212, and 214 may also be, for example, a photographic camera, video camera, tracking device, sensor, accelerometer, gyroscope, mobile device, water treatment system, etc.

Computer system 100 can also be implemented as a server such as server 206, depending upon design considerations. In the depicted example, server 206 provides data such as boot files, operating system images, applications, and application updates to clients 210, 212, and 214, and/or to water treatment system 204. Clients 210, 212, and 214 and water treatment system 204 are clients to server 206 in this example. Network data-processing system 200 may include additional servers, clients, and other devices not shown. Specifically, clients may connect to any member of a network of servers, which provide equivalent content.

In the depicted example, network data-processing system 200 is the Internet with network 202 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, government, educational, and other computer systems that route data and messages. Of course, network data-processing system 200 may also be implemented as a number of different types of networks such as, for example, an intranet, a local area network (LAN) or a wide area network (WAN). FIGS. 18 and 19 are intended as examples and not as architectural limitations for different embodiments of the present invention.

FIG. 20 illustrates a computer software system 300, which may be employed for directing the operation of the data-processing systems such as computer system 100 depicted in FIG. 18. Software application 305, may be stored in memory 104, on removable storage 112, or on non-removable storage 114 shown in FIG. 18, and generally includes and/or is associated with a kernel or operating system 310 and a shell or interface 315. One or more application programs, such as module(s) 125, may be "loaded" (i.e., transferred from removable storage 112 into the memory 104) for execution by the data-processing system 100. The data-processing system 100 can receive user commands and data through user interface 315, which can include input 116 and output 118, accessible by a user 320. These inputs may then be acted upon by the computer system 100 in accordance with instructions from operating system 310 and/or software application 305 and any software module(s) 125 thereof.

Generally, program modules (e.g., module 125) can include, but are not limited to, routines, subroutines, software applications, programs, objects, components, data structures, etc., that perform particular tasks or implement particular abstract data types and instructions. Moreover, those skilled in the art will appreciate that the disclosed method and system may be practiced with other computer system configurations such as, for example, hand-held devices, multi-processor systems, data networks, microprocessor-based or programmable consumer electronics, networked personal computers, minicomputers, mainframe computers, servers, and the like.

Note that the term "module" as utilized herein may refer to a collection of routines and data structures that perform a particular task or implements a particular abstract data type. Modules may be composed of two parts: an interface, which lists the constants, data types, variable, and routines that can be accessed by other modules or routines; and an implementation, which is typically private (accessible only to that module) and which includes source code that actually implements the routines in the module. The term module may also simply refer to an application such as a computer program designed to assist in the performance of a specific task such as word processing, accounting, inventory management, etc.

The interface 315 (e.g., a graphical user interface 130) can serve to display results, whereupon a user 320 may supply additional inputs or terminate a particular session. In some embodiments, operating system 310 and GUI 130 can be implemented in the context of a "windows" system. It can be appreciated, of course, that other types of systems are possible. For example, rather than a traditional "windows" system, other operation systems such as, for example, a real time operating system (RTES) more commonly employed in wireless systems may also be employed with respect to operating system 310 and interface 315. The software application 305 can include, for example, module(s) 125, which can include instructions for carrying out steps or logical operations such as those shown and described herein.

The following description is presented with respect to embodiments of the present invention, which can be embodied in the context of a data-processing system such as computer system 100, in conjunction with program module 125, and data-processing system 200 and network 202 depicted in FIGS. 18-20. The present invention, however, is not limited to any particular application or any particular environment. Instead, those skilled in the art will find that the system and method of the present invention may be advantageously applied to a variety of system and application software including database management systems, word processors, and the like. Moreover, the present invention may be embodied on a variety of different platforms including Macintosh, UNIX, LINUX, and the like. Therefore, the descriptions of the exemplary embodiments, which follow, are for purposes of illustration and not considered a limitation.

It is contemplated that any embodiment discussed in this specification can be implemented with respect to any method, kit, reagent, or composition of the invention, and vice versa. Furthermore, compositions of the invention can be used to achieve methods of the invention.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include"), or "containing" (and any form of containing, such as "contains" and "contain") are inclusive or open-ended and do not exclude additional unrecited elements, or method steps.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC or CAB. Continuing with this example, expressly included are combinations that co artisan will understand that typically there is no limit on the number of items or terms in any combination, unless otherwise apparent from the context.

All of the compositions and/or methods disclosed and claimed herein can be made and executed without undue experimentation in light of the present disclosure. While the compositions and methods of this invention have been described in terms of preferred embodiments, it will be apparent to those skilled in the art that variations may be applied to the compositions and/or methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

The invention claimed is:

1. A method of enhanced recovery from a concentrated feed stream comprising the steps of:
    inputting the concentrated feed stream into a feed tank;
    measuring a concentrated feed stream saturation resulting from one or more compounds in the concentrated feed stream;
    determining an induction time of the concentrated feed stream according to the measured saturation of the concentrated feed from the one or more compounds;
    feeding a concentrate from the feed tank to a membrane unit by pumping at a high pressure, wherein the membrane unit comprises one or more reverse osmosis membranes;
    passing the concentrate through the one or more reverse osmosis membranes in a batch mode;
    collecting a permeate stream from each of the one or more reverse osmosis membranes in a permeate tank; and
    flushing each of the one or more reverse osmosis membranes before an expiration of the induction time determined for the concentrate feed stream.

2. The method of claim 1 further comprising:
    adding an anti-sealant to the concentrated feed stream.

3. The method of claim 1, wherein the batch mode further comprises:
    halting the feeding of the concentrate from the feed tank to the membrane unit while the flushing of each of the one or reverse osmosis membranes is completed.

4. The method of claim 1 further comprising:
    filtering the concentrated feed stream in the feed with a $5\mu$ prefilter and a $1\mu$ prefilter arranged in series between the feed tank and the membrane unit.

5. The method of claim 1, wherein flushing each of the one or more reverse osmosis membranes further comprises:
    flushing the reverse osmosis membranes with at least one of:
    the feed concentrate; and
    the permeate.

6. The method of claim 1 wherein the concentrated feed stream is saturated with at least one of the following salts:
    calcium;
    magnesium;
    barium; and
    strontium.

7. The method of claim 1, wherein the concentrated feed stream comprises one of:
    a concentrate with a total silica concentration exceeding 120 mg/L; and
    a calcium sulfate concentration exceeding 2200 mg/L.

8. The method of claim 1, wherein the one or more reverse osmosis membranes comprises at least one of:
    a spiral-wound membrane; and
    a hollow-fiber membrane.

9. The method of claim 1, wherein the one or more reverse osmosis membrane comprises on of:
    a polyamide membrane or a cellulose acetate membrane.

10. The method of claim 4 further comprising:
    monitoring a temperature of the prefiltered concentrate with a temperature sensor between the $1\mu$ prefilter and the membrane unit;
    monitoring a conductivity of the prefiltered concentrate with a conductivity sensor between the $1\mu$ prefilter and the membrane unit;
    monitoring a pressure of the prefiltered concentrate with a pressure sensor between the $1\mu$ prefilter and the membrane unit; and
    monitoring a pH of the prefiltered concentrate with a pH sensor the $1\mu$ prefilter and the membrane unit.

11. A method of reducing concentration of a silica saturated reverse osmosis concentrate comprising:
    inputting a concentrated feed stream into a feed tank;
    feeding a concentrate from the feed tank to a $5\mu$ prefilter and a $1\mu$ prefilter arranged in series;
    feeding the prefiltered concentrate from the $1\mu$ prefilter to a membrane unit by pumping at a high pressure, wherein the membrane unit comprises a plurality of stages, each of said plurality of stages comprising one or more reverse osmosis membranes arranged in a parallel configuration;
    measuring a concentrate saturation of a concentrate after each of the plurality of stages;
    determining an induction time of the concentrate after each of the plurality of stages according to the measured saturation of the concentrate;
    passing the prefiltered concentrate through the membrane unit in batch mode;
    collecting a permeate stream from each of the plurality of stages in a permeate tank; and
    flushing each of the plurality of stages before an expiration of the induction time determined for that stage is reached.

12. The method of claim 11, further comprising:
    adding an anti-sealant to the concentrated feed stream.

13. The method of claim 11, wherein the batch mode further comprises:
    halting the feeding of the concentrate from the feed tank to the membrane unit while the flushing of each of the one or more reverse osmosis membranes is completed.

14. The method of claim 11, wherein a total silica concentration of the concentrated feed stream exceeds 120 mg/L.

15. The method of claim 11, wherein the one or more osmosis membranes comprises at least one of:
    a spiral-wound membrane; and
    a hollow-fiber membrane.

16. A water treatment system comprising:
    a first water treatment system; and
    an enhanced recovery system comprising:
    a feed tank for collecting a concentrated feed stream comprising concentrate from the first water treatment system;
    a membrane unit comprising at least one reverse osmosis membrane;
    a pump for passing the feed water from the feed tank through the membrane unit to separate a permeate and a concentrate;
    a computer system, the computer system configured to provide operations comprising:
    measuring the concentrated feed stream saturation resulting from one or more compounds in the concentrated feed stream; and determining an induction time of the concentrated feed stream according to the measured saturation of the concentrated feed stream from the one or more compounds;
a flushing system configured to flush the at least one reverse osmosis membrane before an expiration of the induction time determined for the concentrate; and
permeate tank for collecting the permeate from the enhanced recovery system.

17. The water treatment system of claim 16 wherein the first water treatment system further comprises:
a desalination system for desalinating water, wherein the desalination system provides the concentrated feed stream to the enhanced recovery system.

18. The water treatment system of claim 16 wherein the at least one reverse osmosis membrane comprises at least two semi-permeable reverse osmosis membranes, the at least two semi-permeable reverse osmosis membranes being arranged in a parallel single-stage configuration.

19. The water treatment system of claim 16 further comprising:
a temperature sensor for monitoring a temperature of the concentrate;
a conductivity sensor for monitoring a conductivity of the concentrate;
a pressure sensor for monitoring a pressure of the concentrate; and
a pH sensor for monitoring a pH of the concentrate.

* * * * *